(12) United States Patent
Nakamura

(10) Patent No.: US 10,944,945 B2
(45) Date of Patent: Mar. 9, 2021

(54) PROJECTION DEVICE AND PROJECTION METHOD, PROJECTION MODULE, ELECTRONIC DEVICE, AND PROGRAM

(71) Applicant: Sony Corporation, Tokyo (JP)

(72) Inventor: Masashi Nakamura, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 15/575,551

(22) PCT Filed: Jun. 3, 2016

(86) PCT No.: PCT/JP2016/066573
§ 371 (c)(1),
(2) Date: Nov. 20, 2017

(87) PCT Pub. No.: WO2016/203993
PCT Pub. Date: Dec. 22, 2016

(65) Prior Publication Data
US 2018/0131915 A1 May 10, 2018

(30) Foreign Application Priority Data
Jun. 19, 2015 (JP) .............................. JP2015-124109

(51) Int. Cl.
*H04N 9/31* (2006.01)
*G02B 26/10* (2006.01)
*G09G 3/02* (2006.01)

(52) U.S. Cl.
CPC ......... *H04N 9/3185* (2013.01); *G02B 26/101* (2013.01); *G09G 3/025* (2013.01);
(Continued)

(58) Field of Classification Search
CPC .. H04N 9/3129; H04N 9/3185; G02B 26/101; G09G 2320/029; G09G 3/025
(Continued)

(56) References Cited

U.S. PATENT DOCUMENTS 5,610,897 A * 3/1997 Yamamoto ........... G11B 7/0051
369/124.03
2009/0128717 A1* 5/2009 Nagashima .......... H04N 9/3129
348/756
(Continued)

FOREIGN PATENT DOCUMENTS

JP 2003-021800 A 1/2003
JP 2011-180541 A 9/2011
(Continued)

*Primary Examiner* — Jefferey F Harold
*Assistant Examiner* — Jean W Desir
(74) *Attorney, Agent, or Firm* — Michael Best & Friedrich LLP

(57) ABSTRACT

A projection device and a projection method, a projection module, an electronic device, and a program that correct a misalignment of an optical axis are disclosed. Test emission is performed of a laser beam that is a light source in a projector, and a position of the optical axis of the laser beam is obtained from a ratio of an amount of light detected by a photodetector divided into a plurality of areas that is a two-dimensional plane perpendicular to the optical axis. The misalignment of the optical axis is obtained on the basis of information regarding a position of the optical axis of each of R, G, and B, a correction coefficient is calculated for correcting a shift of a pixel position on a projection image projected on a screen, and a pixel position to be projected is corrected with the correction coefficient and projected with RGB misalignment correction.

18 Claims, 29 Drawing Sheets

(52) U.S. Cl.
CPC ......... *H04N 9/3129* (2013.01); *H04N 9/3164* (2013.01); *H04N 9/3194* (2013.01); *G09G 2320/029* (2013.01)

(58) Field of Classification Search
USPC ........ 348/744, 745, 746, 747, 806, 807, 191
See application file for complete search history.

(56) References Cited

U.S. PATENT DOCUMENTS

2014/0092151 A1\* 4/2014 Seno .................... G09G 3/3674
345/698
2016/0330418 A1\* 11/2016 Nakai .................. H04N 9/3135

FOREIGN PATENT DOCUMENTS

| | | |
|---|---|---|
| JP | 2014-071244 A | 4/2014 |
| JP | 2014-197053 A | 10/2014 |
| WO | 2009/154134 A1 | 12/2009 |
| WO | 2010/146974 A1 | 12/2010 |
| WO | 2012/120589 A1 | 9/2012 |

\* cited by examiner

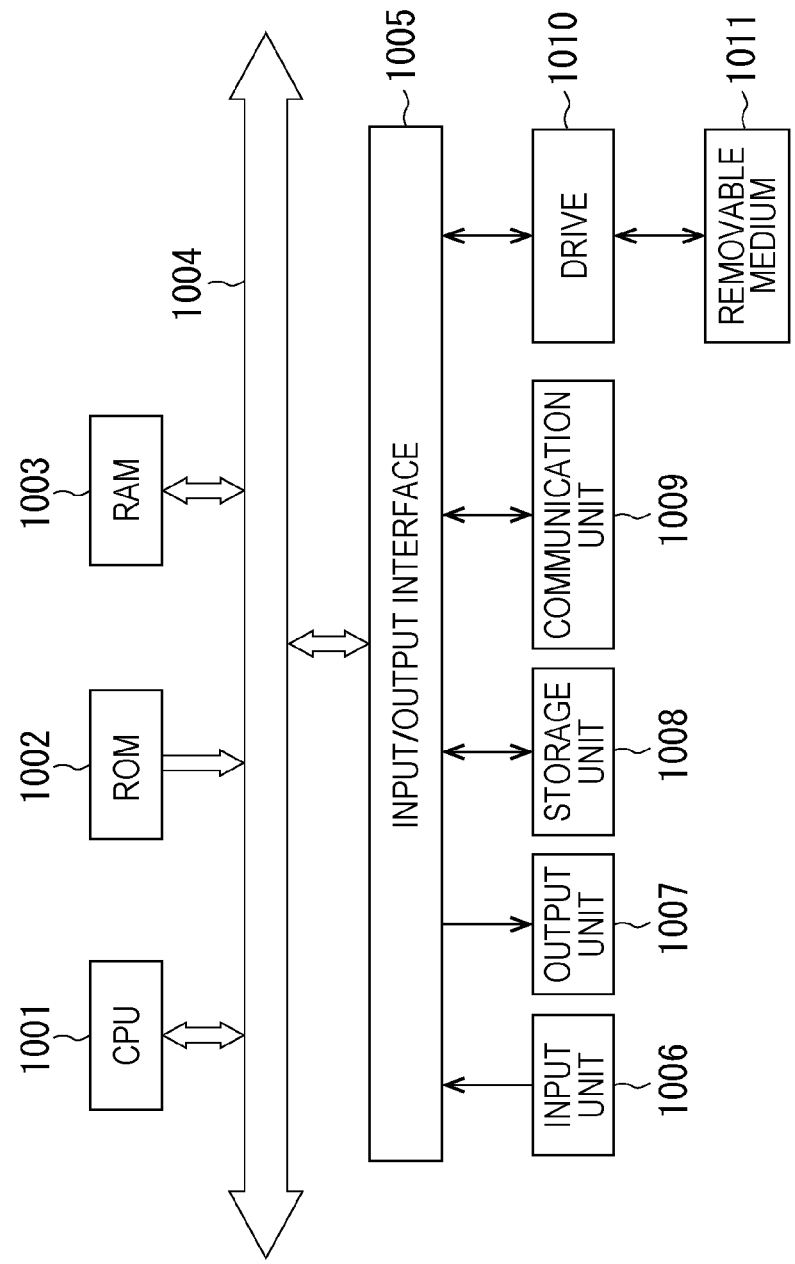

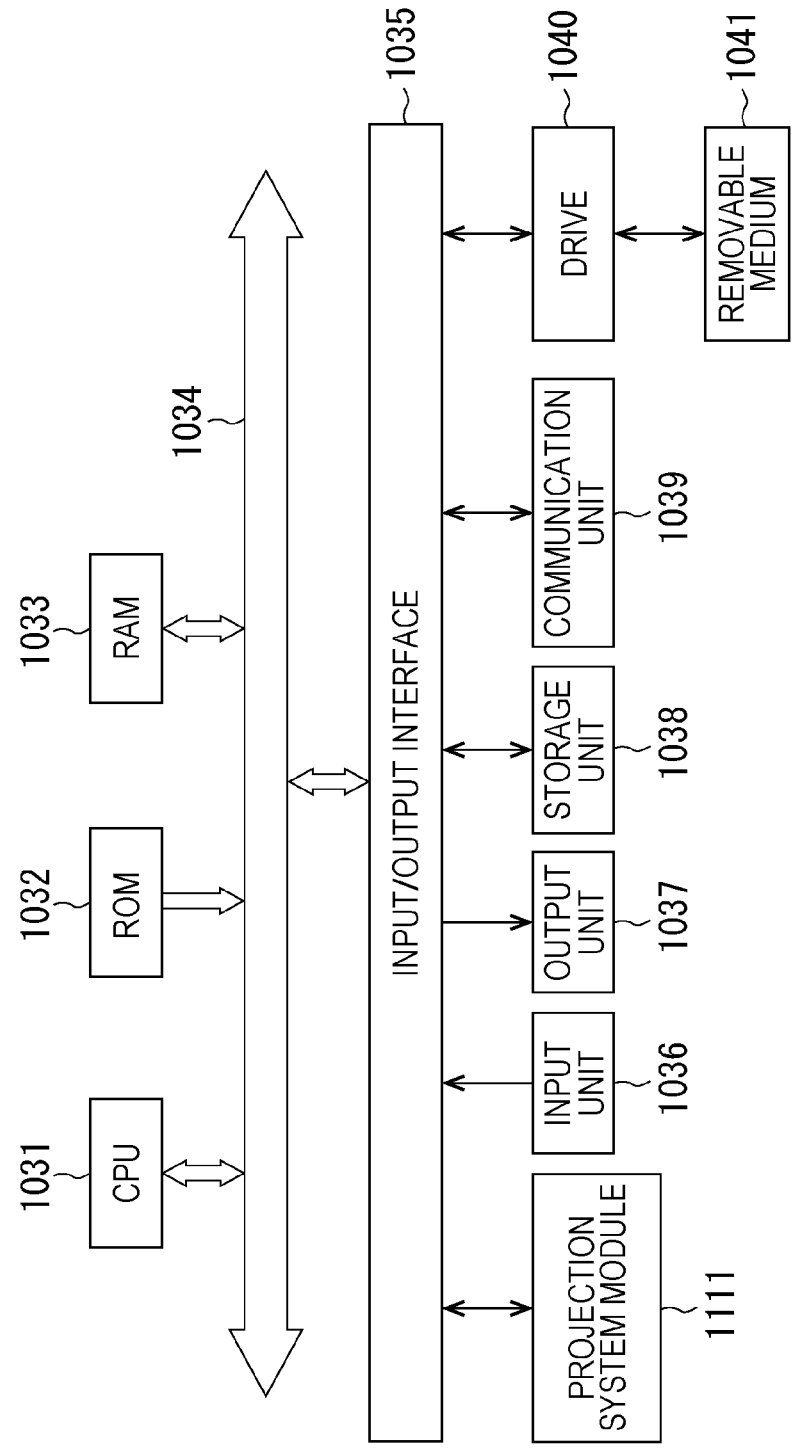

PROJECTION DEVICE AND PROJECTION METHOD, PROJECTION MODULE, ELECTRONIC DEVICE, AND PROGRAM

TECHNICAL FIELD

The present technology relates to a projection device and a projection method, a projection module, an electronic device, and a program, and in particular relates to a projection device and a projection method, a projection module, an electronic device, and a program capable of improving image quality of an image projected by a projector.

BACKGROUND ART

Conventionally, for example, a projector exists that performs scanning to reciprocate a laser beam sinusoidally to a screen as a target (for example, see Patent Document 1).

With this projector, a drive mirror for reflecting the laser beam is driven, and the laser beam reflected from the drive mirror is emitted to each position on the screen.

Accordingly, a spotlight that is spot-like light is projected by emission of the laser beam at each position on the screen. That is, on the screen, an image is projected in which a plurality of spotlights is each pixel.

Incidentally, scanning of the laser beam is performed at a scan speed corresponding to a resonance frequency of the drive mirror, so that the scan speed is the fastest at the center of the screen, and is slower as the laser beam is closer to the edge of the screen. In addition, the conventional projector emits the laser beam at a predetermined interval.

For this reason, as the laser beam is closer to the edge of the screen, the spotlights are closer to each other, and the width of the spotlight is wider.

For this reason, with the conventional projector, as described above, as the laser beam is closer to the edge of the screen, the spotlights are closer to each other, and the width of the spotlight is wider, so that interference between the spotlights may occur on the screen.

As a result, due to the interference between the spotlights, image quality of the image projected on the screen has been degraded.

Therefore, a technology is devised that reduces the interference between the spotlights to improve the image quality of the image projected on the screen (see Patent Document 2).

CITATION LIST

Patent Document

Patent Document 1: Japanese Patent Application Laid-Open No. 2003-021800
Patent Document 2: Japanese Patent Application Laid-Open No. 2014-071244

SUMMARY OF THE INVENTION

Problems to be Solved by the Invention

By the way, in resolution of the projector using technologies of Patent Documents 1 and 2, the scan speed of the drive mirror is rate-limiting.

Therefore, to realize resolution exceeding a projection image realized at the scan speed of the current drive mirror, it is necessary to further improve the scan speed of the drive mirror.

However, there is a limit to the scan speed of the drive mirror, and as a result, the resolution of the image projected by the projector has had a limitation that is the rate-limiting of the scan speed of the drive mirror.

In addition, in the projectors using the technologies of Patent Documents 1 and 2, there has been a possibility that color bleeding occurs due to misalignment of an optical axis of each of light sources of R, G, and B.

The present technology has been made in view of such a situation, and in particular is able to improve image quality of the image projected by the projector.

Solutions to Problems

The projection device of one aspect of the present technology is a projection device including: a laser beam generation unit that generates a laser beam according to a pixel signal of an input image; one scan unit that reflects the laser beam generated by the laser beam generation unit and performs scanning to project the laser beam on a screen; a detection unit that detects a position of an optical axis of the laser beam generated by the laser beam generation unit; a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

The detection unit can include a plurality of light amount detection units each of which detects an amount of light of the laser beam in a corresponding area, the area being a two-dimensional plane substantially perpendicular to an optical axis of the laser beam, the area being divided into a plurality of areas, and detect the position of the optical axis of the laser beam on the basis of a ratio of the amount of light detected by each of the plurality of light amount detection units.

The correction coefficient calculation unit can be configured to obtain an amount of shift of a pixel position projected on the screen on the basis of the information regarding the position of the optical axis of the laser beam in the detection unit, and, on the basis of the amount of shift, calculate the correction coefficient, as a correction value, for converting a pixel position to be projected, into a pixel position at which the laser beam generated by the laser beam generation unit is actually projected.

The correction unit can be configured to correct a pixel position in the input image with the correction coefficient that is the correction value, and supply a pixel signal of the pixel position corrected to the laser beam generation unit, and the laser beam generation unit can be configured to generate the laser beam on the basis of the pixel signal of the pixel position corrected.

The correction coefficient calculation unit can be configured to update the correction coefficient on the basis of a difference between a previous amount of shift of the optical axis of the laser beam and a current amount of shift of the optical axis.

The correction unit can be configured to correct a pixel position of the pixel signal in the input image with the correction coefficient updated, and supply a pixel signal of the pixel position corrected to the laser beam generation unit, and the laser beam generation unit can be configured to generate the laser beam on the basis of the pixel signal of the pixel position corrected.

The laser beam generation unit, the collimator lens, and the laser beam generation unit are provided for each of R, G, and B, the detection unit can be configured to detect a position of the optical axis of each of the R, G, and B, the correction coefficient calculation unit can be configured to, on the basis of information regarding the position of the optical axis of each of the R, G, and B detected by the detection unit, set a position of any optical axis as an origin, and obtain a difference from a position of another optical axis, and, on the basis of the difference, calculate a correction coefficient for correcting a pixel position of when projection is performed on the screen for the other optical axis, and the correction unit can be configured to convert the pixel position of the pixel signal of the input image signal corresponding to the other optical axis to perform correction, on the basis of the correction coefficient.

The correction coefficient calculation unit can be configured to, on the basis of information regarding the position of the optical axis of each of the R, G, and B detected by the detection unit, set a position of any optical axis as an origin, and obtain a current difference from a position of another optical axis, and, on the basis of an amount of change from the difference in the past, update the correction coefficient for correcting the pixel position of when projection is performed on the screen for the other optical axis.

The projection device can further include a test emission control unit that controls the laser beam generation unit to control generation of a laser beam for test emission for calculating the correction coefficient, in which the correction coefficient calculation unit calculates the correction coefficient for correcting the amount of shift of the laser beam, on the basis of the position of the optical axis detected by the detection unit, when control is performed by the test emission control unit and the laser beam for test emission is generated by the laser beam generation unit.

The test emission control unit can be configured to control the laser beam generation unit to generate the laser beam for test emission for calculating the correction coefficient, when a position being scanned on the screen by the scan unit is a blanking area for the projection image.

The test emission control unit can be configured to randomly set, as a test emission position, any of a plurality of partial areas included in the blanking area, and control the laser beam generation unit to generate the laser beam for test emission for calculating the correction coefficient, when a position being scanned on the screen by the scan unit is a blanking area for a projection image and is an area set as the test emission position.

The projection device can further include an average value calculation unit that calculates an average value on a frame-by-frame basis of brightness of a pixel on the screen, when a laser beam for other than the test emission is generated by the laser beam generation unit, in which the test emission control unit controls the laser beam generation unit to generate the laser beam for test emission for calculating the correction coefficient with brightness based on the average value.

The test emission control unit can be configured to control the laser beam generation unit to generate the laser beam for test emission for calculating the correction coefficient with emission intensity according to a tendency of color of the image projected on the screen by an input image signal.

The test emission control unit can be configured to control the laser beam generation unit, on the basis of temperature and emission frequency of the laser beam generation unit, to generate the laser beam for test emission for calculating the correction coefficient.

The projection method of one aspect of the present technology is a projection method of a projection device, the projection device including: a laser beam generation unit that generates a laser beam according to a pixel signal of an input image; one scan unit that reflects the laser beam generated by the laser beam generation unit and performs scanning to project the laser beam on a screen; a detection unit that detects a position of an optical axis of the laser beam generated by the laser beam generation unit; a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient, the projection method including: generating the laser beam according to the pixel signal of the input image, by the laser beam generation unit; reflecting the laser beam generated by the laser beam generation unit and performing scanning to project the laser beam on the screen, by the operation unit; detecting the position of the optical axis of the laser beam generated by the laser beam generation unit, by the detection unit; calculating the correction coefficient for correcting the amount of shift of the laser beam on the basis of the information regarding the position of the optical axis detected by the detection unit, by the correction coefficient calculation unit; and correcting the pixel signal in the input image on the basis of the correction coefficient, by the correction unit.

The program of one aspect of the present technology is a program to cause a computer to function as: a laser beam generation unit that generates a laser beam according to a pixel signal of an input image; one scan unit that reflects the laser beam generated by the laser beam generation unit and performs scanning to project the laser beam on a screen; a detection unit that detects a position of an optical axis of the laser beam generated by the laser beam generation unit; a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

The projection module of one aspect of the present technology is a projection module including: a laser beam generation unit that generates a laser beam according to a pixel signal of an input image; one scan unit that reflects the laser beam generated by the laser beam generation unit and performs scanning to project the laser beam on a screen; a detection unit that detects a position of an optical axis of the laser beam generated by the laser beam generation unit; a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

The electronic device of one aspect of the present technology is an electronic device including: a laser beam generation unit that generates a laser beam according to a pixel signal of an input image; one scan unit that reflects the laser beam generated by the laser beam generation unit and performs scanning to project the laser beam on a screen; a detection unit that detects a position of an optical axis of the laser beam generated by the laser beam generation unit; a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

In one aspect of the present technology, a laser beam according to a pixel signal of an input image is generated by a laser beam generation unit; the laser beam generated by the laser beam generation unit is reflected and scanning of the laser beam is performed to project the laser beam on a screen, by one scan unit; a position of an optical axis of the laser beam generated by the laser beam generation unit is detected by a detection unit; a correction coefficient by which an amount of shift of the laser beam is corrected on the basis of information regarding the position of the optical axis detected by the detection unit, is calculated by a correction coefficient calculation unit; and the pixel signal in the input image is corrected by a correction unit on the basis of the correction coefficient.

The projection device of one aspect of the present technology may be an independent apparatus, or may be a block that functions as the projection device.

Effects of the Invention

With one aspect of the present technology, it is possible to improve image quality of the image projected by the projector.

BRIEF DESCRIPTION OF DRAWINGS

FIG. 28 is a diagram for describing a configuration example of a general purpose personal computer.

FIG. 29 is a diagram for describing a configuration example of an electronic device.

MODE FOR CARRYING OUT THE INVENTION

<Configuration Example of Projection System>

Figure 1:
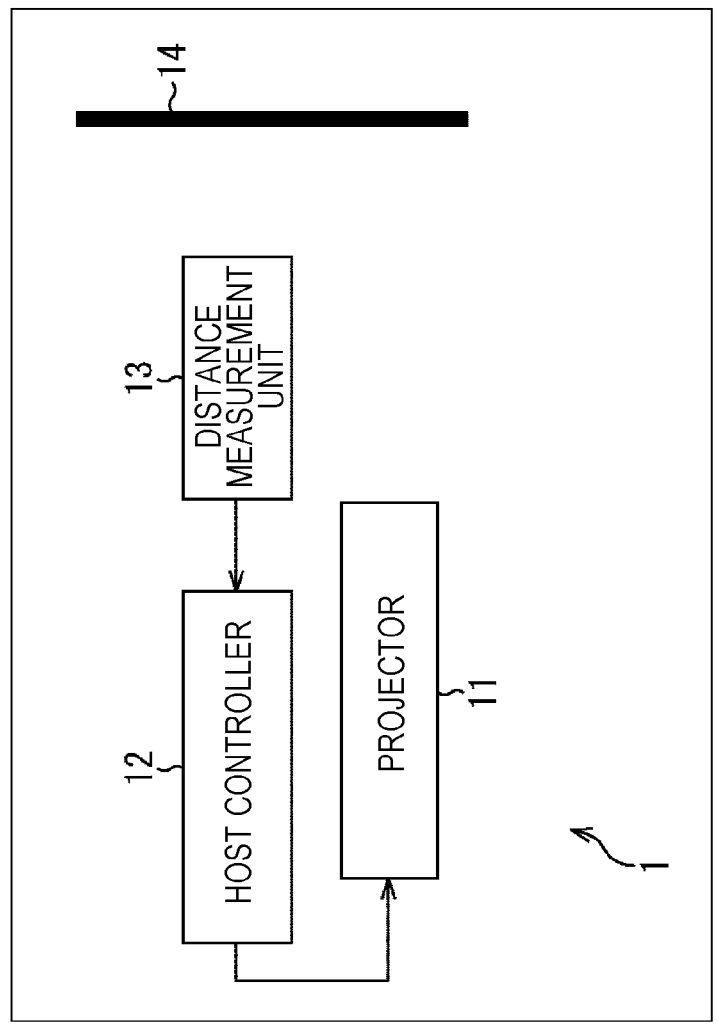
FIG. 1 is a block diagram illustrating a configuration example of a projection system to which the present technology is applied.

FIG. 1 illustrates a configuration example of a projection system 1 to which the present technology is applied.

The projection system 1 includes a projector 11, a host controller 12, a distance measurement unit 13, and a screen 14.

Incidentally, the projection system 1 suppresses interference between spotlights each of which is spot-like light projected as a pixel at each position on the screen 14, and improves image quality of a projection image projected on the screen 14.

That is, for example, the projector 11 controls emission of a laser beam on the basis of a distance to the screen 14, a position on the screen 14 on which the spotlight is projected, and the like, to suppress the interference between the spotlights on the screen 14.

Incidentally, it is known that, on the screen 14, the interference between the spotlights is more likely to occur as the distance to the screen 14 is shorter and as the position on the screen 14 on which the spotlight is projected is closer to an edge. Incidentally, the interference between the spotlights will be described in detail with reference to FIG. 6.

The host controller 12 controls the projector 11 to emit the laser beam on the screen 14, thereby projecting the projection image having the spotlight on the screen 14 as each pixel.

In addition, the host controller 12 supplies, to the projector 11, (information indicating) the distance to the screen 14 (hereinafter, simply referred to as a screen distance) supplied from the distance measurement unit 13.

In the projector 11, the screen distance (the distance to the screen 14) supplied from the host controller 12 is referred to when emission of the laser beam is controlled.

The distance measurement unit 13 measures the screen distance, and supplies the measurement result to the host controller 12.

Incidentally, the distance measurement unit 13 is provided near an emission port for emitting the laser beam, of the projector 11. Therefore, the screen distance is a distance from the emission port of the projector 11 to the screen 14.

In addition, the distance measurement unit 13 may have any configuration as far as the screen distance can be measured, and the measurement method is not limited, either.

That is, for example, by adopting a laser range finder as the distance measurement unit 13 and measuring time from when laser light is emitted until the reflected light is detected, the screen distance can be measured.

Besides, for example, by adopting a plurality of cameras as the distance measurement unit 13 and using a captured image obtained by capturing of the plurality of cameras, the screen distance may be measured by stereo processing that measures the distance from parallax between the cameras.

Incidentally, the distance measurement unit 13 may be incorporated in the projector 11, for example.

By the laser beam emitted from the projector 11, the screen 14 projects the projection image having the spotlight corresponding to the laser beam as the pixel.

<Suppression of Interference Between Spotlights>

Next, with reference to FIG. 2, an example will be described of when the projector 11 controls emission of the laser beam to suppress the interference between the spotlights.

Figure 2:
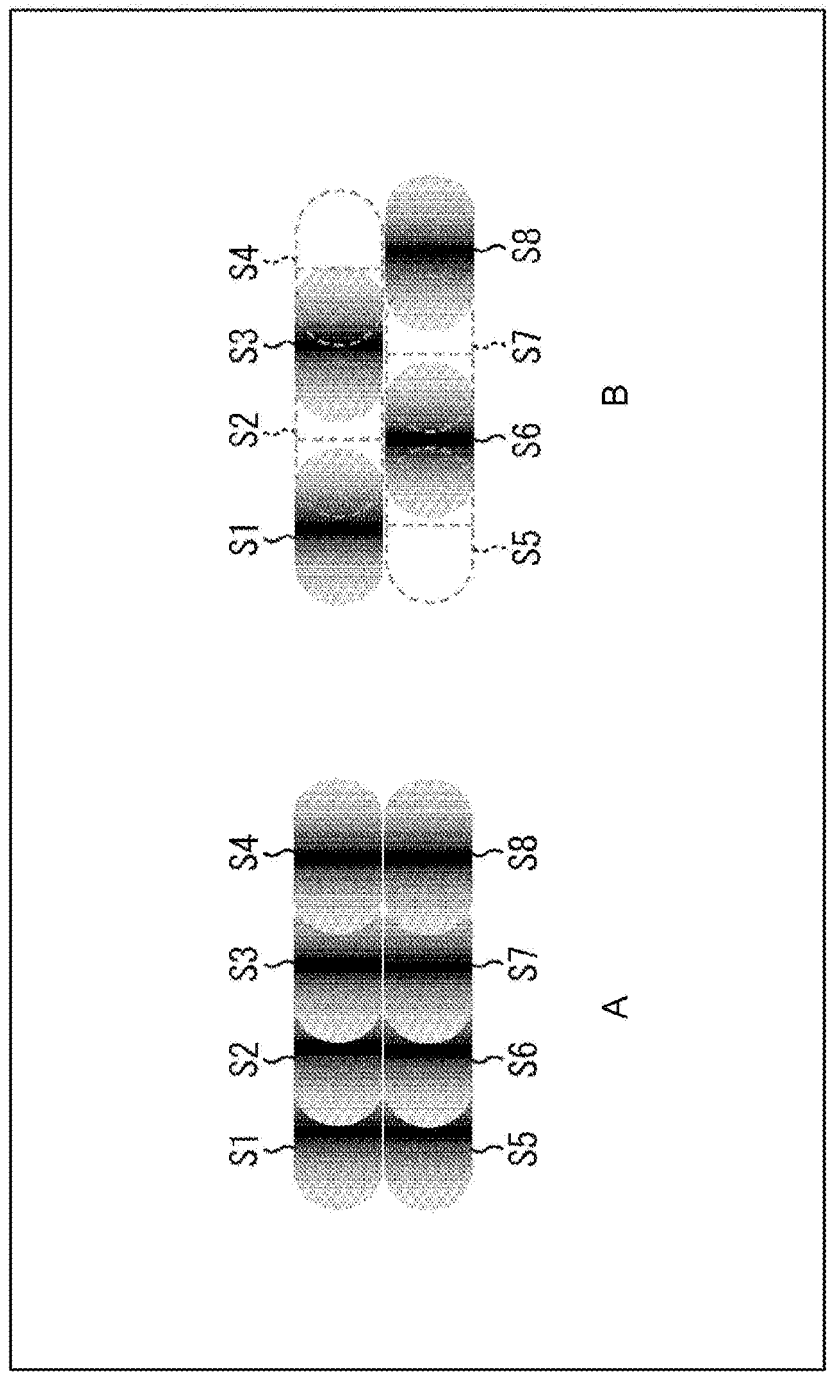
FIG. 2 is a diagram illustrating an example of when interference between spotlights is suppressed.

In A of FIG. 2, an example is illustrated of a plurality of spotlights S1 to S8 projected on the screen 14 at respective different timings.

In B of FIG. 2, an example is illustrated of when only the spotlights S1, S3, S6, and S8 not overlapping with each other are projected, out of the spotlights S1 to S8.

As illustrated in A of FIG. 2, for example, a part of the spotlight S1 overlaps with a part of the spotlight S2 adjacent to the right side of the figure, so that interference of light occurs between the spotlight S1 and the spotlight S2.

Similarly, interference of light occurs at each location between the spotlight S2 and the spotlight S3, the spotlight S3 and the spotlight S4, the spotlight S5 and the spotlight S6, the spotlight S6 and the spotlight S7, and the spotlight S7 and the spotlight S8.

Therefore, for example, the projector 11 only performs emission of the laser beam corresponding to each of the spotlights S1, S3, S6, S8 out of the spotlights S1 to S8, to prevent a situation in which the interference between the spotlights occurs.

In this case, on the screen 14, as illustrated in B of FIG. 2, only the spotlights S1, S3, S6, and S8 are projected as the pixel of the projection image.

Figure 3:
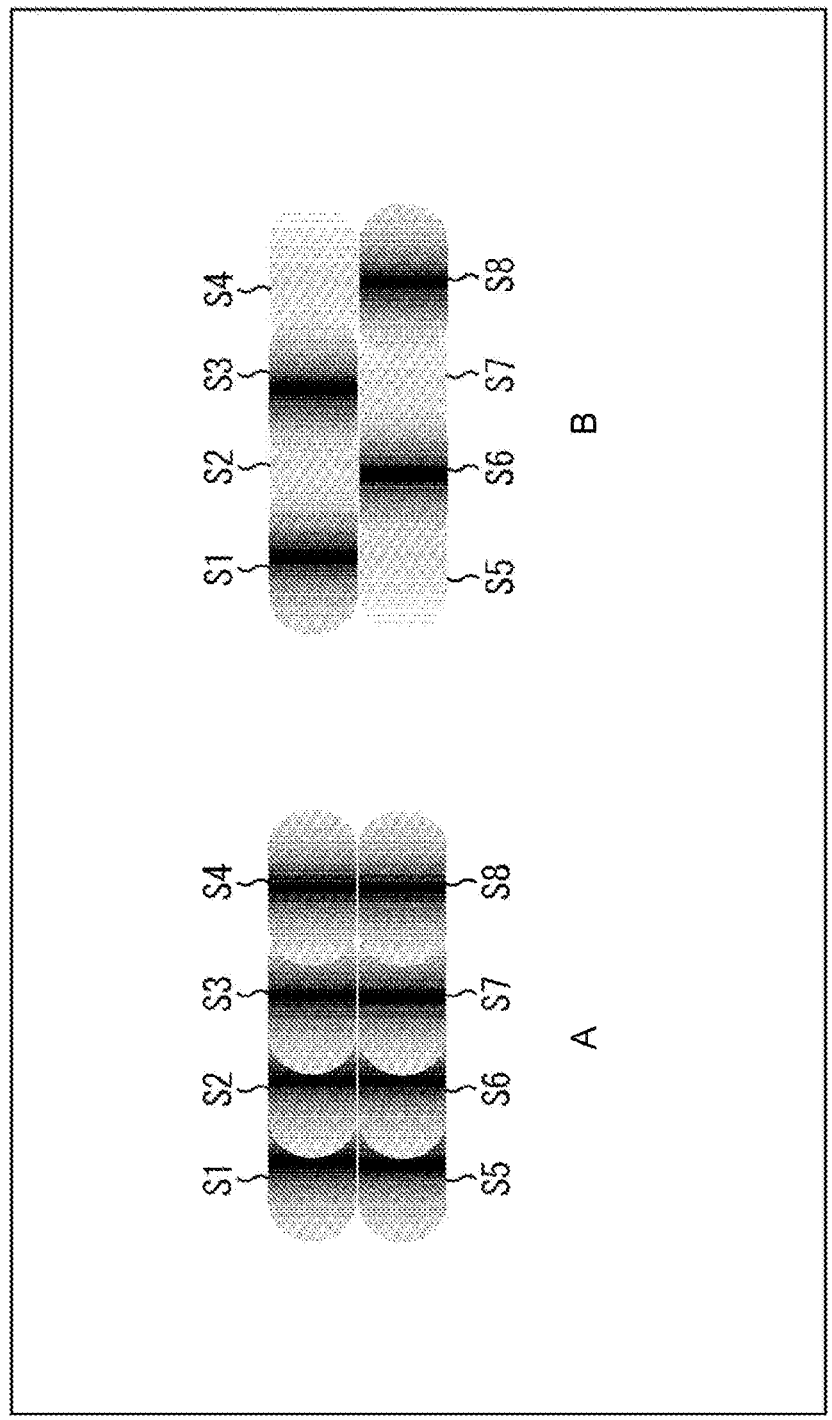
FIG. 3 is a diagram illustrating another example of when the interference between the spotlights is suppressed.

Next, FIG. 3 illustrates another example of when the projector 11 controls the emission of the laser beam to suppress the interference between the spotlights.

In A of FIG. 3, similarly to A of FIG. 2, an example is illustrated of the plurality of spotlights S1 to S8 projected on the screen 14 at respective different timings.

In B of FIG. 3, an example is illustrated of the spotlights S2, S4, S5, and S7 whose brightness is adjusted so as not to influence the spotlights S1, S3, S6, and S8, together with the spotlights S1, S3, S6, and S8 not overlapping with each other.

In A of FIG. 3, interference of light occurs at each location between the spotlight S1 and the spotlight S2, the spotlight S2 and the spotlight S3, the spotlight S3 and the spotlight S4, the spotlight S5 and the spotlight S6, the spotlight S6 and the spotlight S7, and the spotlight S7 and the spotlight S8.

Therefore, for example, the projector 11 adjusts the brightness of the spotlights S2, S4, S5, and S7 to a brightness equal to or less than a predetermined threshold (for example, the brightness is adjusted to 0), to prevent the situation in which the interference between the spotlights occurs.

In this case, on the screen 14, the spotlights S1 to S8 are projected as the pixel of the projection image, as illustrated in B of FIG. 3.

<Configuration Example of First Embodiment of Projector 11 to which Present Technology is Applied>

Next, with reference to FIG. 4, a configuration example will be described of a first embodiment of the projector 11 of the present technology of FIG. 1.

The projector 11 projects, on the screen 14, a projection image 14a using the laser beam as a light source. In addition, the projector 11 includes a controller 21, a laser driver 22, a mirror driver 23, laser light source units 24R, 24G, and 24B, a mirror 25, dichroic mirrors 26-1 and 26-2, a drive mirror 27, and an optical lens 28.

The controller 21 is supplied with an input image signal as image data of the projection image 14a projected on the screen 14 from the host controller 21 of FIG. 1, for example.

The controller 21 generates pixel data for each color (red, green, and blue) of each pixel configuring the projection image 14a, on the basis of the input image signal supplied from the host controller 12, by interpolation, and supplies the pixel data to the laser driver 22 in synchronization with a mirror synchronization signal acquired from the mirror driver 23. Incidentally, the mirror synchronization signal is a signal for driving the mirror driver 23 in synchronization with the input image signal. Further, the controller 21 is supplied with a control signal from the host controller 12, and the controller 21 performs control according to the control signal.

The laser driver 22 generates a drive signal according to a pixel value for each pixel of the projection image 14a on the basis of the pixel data for each color supplied from the controller 21, and supplies the drive signal to the laser light source units 24R, 24G, and 24B. That is, for example, the laser driver 22 supplies the drive signal according to the pixel value of red pixel data to the laser light source unit 24R, supplies the drive signal according to the pixel value of green pixel data to the laser light source unit 24G, and supplies the drive signal according to the pixel value of blue pixel data to the laser light source unit 24B.

The mirror driver 23 generates a horizontal scan signal and a vertical scan signal based on a resonance frequency of the drive mirror 27 and supplies the signals to the drive mirror 27 in order to perform scanning of the laser beam in a horizontal direction (left-right direction in the figure) and a vertical direction (up-down direction in the figure) of the screen 14. In addition, the mirror driver 23 includes a light-receiving unit (not illustrated) for detecting a part of the laser beam reflected by the drive mirror 27. Then, the mirror driver 23 adjusts the horizontal scan signal and the vertical scan signal on the basis of a detection result of the light-receiving unit, and performs feedback of a detection signal according to the detection result of the light-receiving unit to the controller 21.

The laser light source units 24R, 24G, and 24B each output the laser beam of corresponding color (of light of a wavelength) in accordance with the drive signal supplied from the laser driver 22. For example, the laser light source unit 24R outputs a red laser beam at a level according to the pixel value of the red pixel data. Similarly, the laser light source unit 24G outputs a green laser beam at a level according to the pixel value of the green pixel data, and the laser light source unit 24B outputs a blue laser beam at a level according to the pixel value of the blue pixel signal.

Incidentally, in the following, in a case where it is not necessary to distinguish the laser light source units 24R, 24G, and 24B from each other, the light sources are also referred to simply as the laser light source unit 24.

The mirror 25 reflects the red laser beam output from the laser light source unit 24R. The dichroic mirror 26-1 reflects the green laser beam output from the laser light source unit 24G, and transmits the red laser beam reflected by the mirror 25. The dichroic mirror 26-2 reflects the blue laser beam output from the laser light source unit 24B, and transmits the red laser beam reflected by the mirror 25 and the green laser beam reflected by the dichroic mirror 26-1. Incidentally, the mirror 25 and the dichroic mirrors 26-1 and 26-2 are combined and arranged such that optical axes of the laser beams output from the laser light source units 24R, 24G, and 24B are the same axis.

The drive mirror 27 is a minute mirror formed by Micro Electro Mechanical Systems (MEMS), for example, and is driven in accordance with the horizontal scan signal and the vertical scan signal supplied from the mirror driver 23. That is, for example, the drive mirror 27 is driven such that the laser beams output from the laser light source units 24R, 24G, and 24B are reflected, and scanning of those laser beams is performed in the horizontal direction and the vertical direction of the screen 14.

The optical lens 28 is arranged on an optical path of the laser beam from the drive mirror 27 toward the screen 14, and corrects the optical path of the laser beam.

Incidentally, the projector 11 can adopt a configuration in which the laser driver 22 and the mirror driver 23 are integrated with the controller 21. In addition, the projector 11 may have a configuration in which the optical lens 28 is not arranged on the optical path of the laser beam.

In this way, the projector 11 drives the drive mirror 27 to perform scanning of the laser beam, thereby projecting the two-dimensional projection image 14a on the screen 14. In addition, scan methods of the laser beam by the drive mirror 27 include, for example, a method called raster scan, and a method called Lissajous scan, and the raster scan is adopted in the projector 11, for example.

<Raster Scan>

Figure 5:
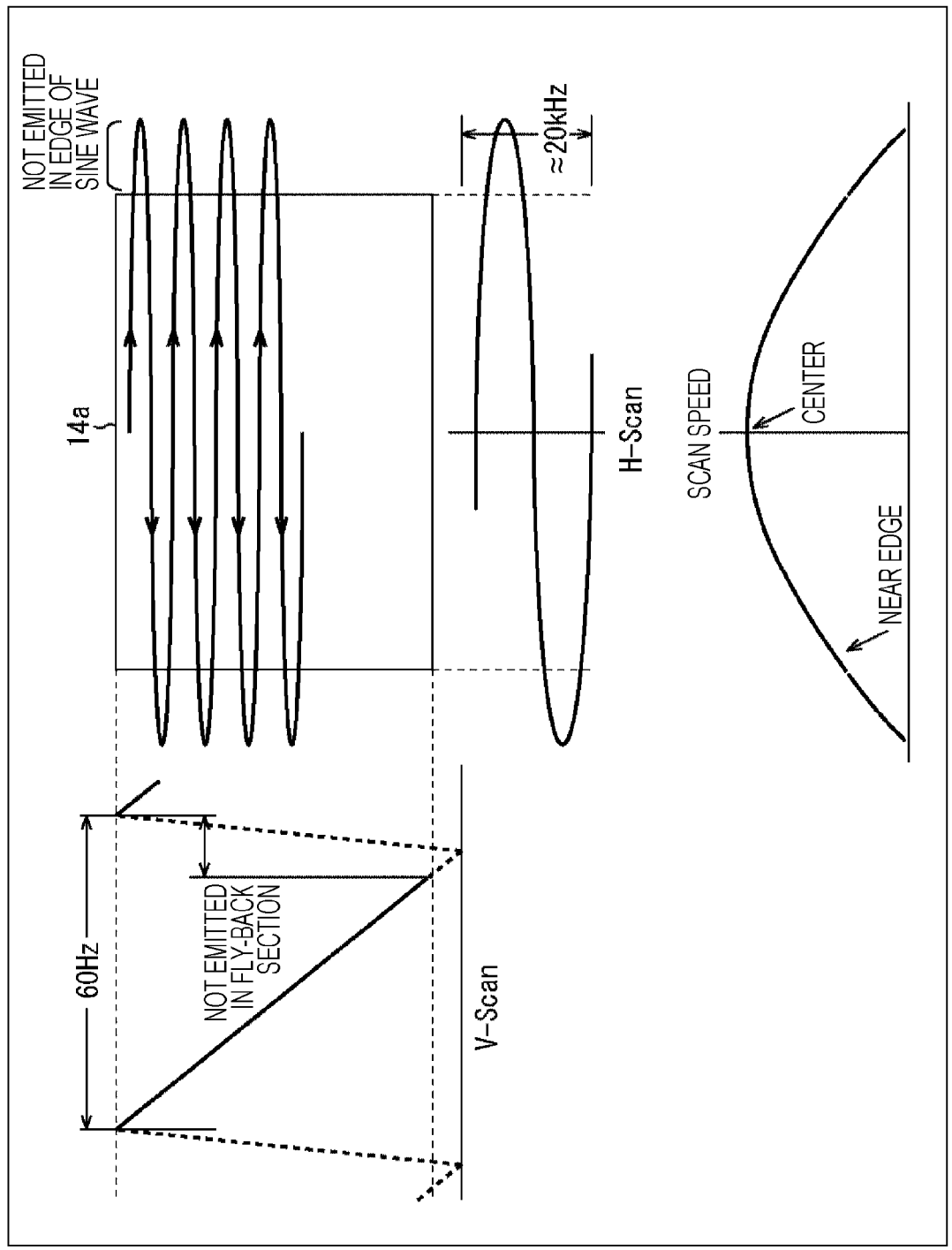
FIG. 5 is a diagram for explaining raster scan.

With reference to FIG. 5, the raster scan will be described.

FIG. 5 illustrates a scanning trajectory of the laser beam by the raster scan on the projection image 14a, and a horizontal scan signal H-Scan is illustrated below the projection image 14a, and a vertical scan signal V-Scan is illustrated in the left side of the projection image 14a.

The horizontal scan signal H-Scan is a signal having a waveform of a sine wave oscillating at about 20 kHz according to the resonance frequency of the drive mirror 27, for example, and a frequency of the horizontal scan signal H-Scan is ½ of a horizontal synchronization frequency of the projection image 14a. The vertical scan signal V-Scan is a signal having a waveform of a sawtooth wave oscillating at 60 Hz that is a frequency according to a frame period of the projection image 14a, for example.

Incidentally, in the scanning trajectory near both ends of the horizontal scan signal H-Scan, it is possible to prevent the laser beam from being emitted, and prevent a turning back portion of the scanning trajectory from being used for projecting the projection image 14a. In addition, in a section where the vertical scan signal V-Scan has a waveform rising substantially vertically, that is, a fly-back section where the scanning trajectory of the laser beam steeply changes from a lower end (a position at an end of scanning) toward an upper end (a position at a start of next scan), the laser beam is not emitted.

The drive mirror 27 is driven in accordance with such horizontal scan signal H-Scan and vertical scan signal V-Scan, whereby scanning of the laser beam is performed with the scanning trajectory as illustrated on the projection image 14a. As illustrated in the figure, scanning of the laser beam is performed in both directions. That is, for each one line of scan lines toward the horizontal direction, scan directions of the laser beam are reversed. For this reason, in the projector 11, it is necessary to perform processing for rearranging the input image signal for each one line of the scan lines, and change a data access direction for the input image signal.

In addition, as illustrated below the horizontal scan signal H-Scan in FIG. 5, the scan speed of the laser beam is increased at the center of the projection image 14a, while the scan speed is decreased near an edge of the projection image 14a. Accordingly, it is assumed that unevenness of brightness occurs in the projection image 14a, so that, in the projector 11, adjustment is performed to reduce output of the laser beam near the edge of the projection image 14a to make the brightness even. Similarly, the projector 11 may adjust a rate of the input image signal, if necessary.

Further, scanning of the laser beam is performed in accordance with the sine wave, so that intervals between the scan lines toward the horizontal direction are uneven. Generally, in an image signal standard, an image includes a pixel array in which pixels are arranged in a lattice pattern, so that, when the input image signal according to the image signal standard is output in accordance with the scanning trajectory of the laser beam according to the sine wave, misalignment occurs for each pixel in the projection image 14a. Incidentally, in the projector 11 of FIG. 4, an example is illustrated in which the number of the drive mirrors 27 is one; however, drive mirrors may be respectively provided for performing scanning of scanning paths in the horizontal direction and the vertical direction.

<Relationship Between Scanning Trajectory of Laser Beam and Pixel Array According to Image Signal Standard>

Figure 6:
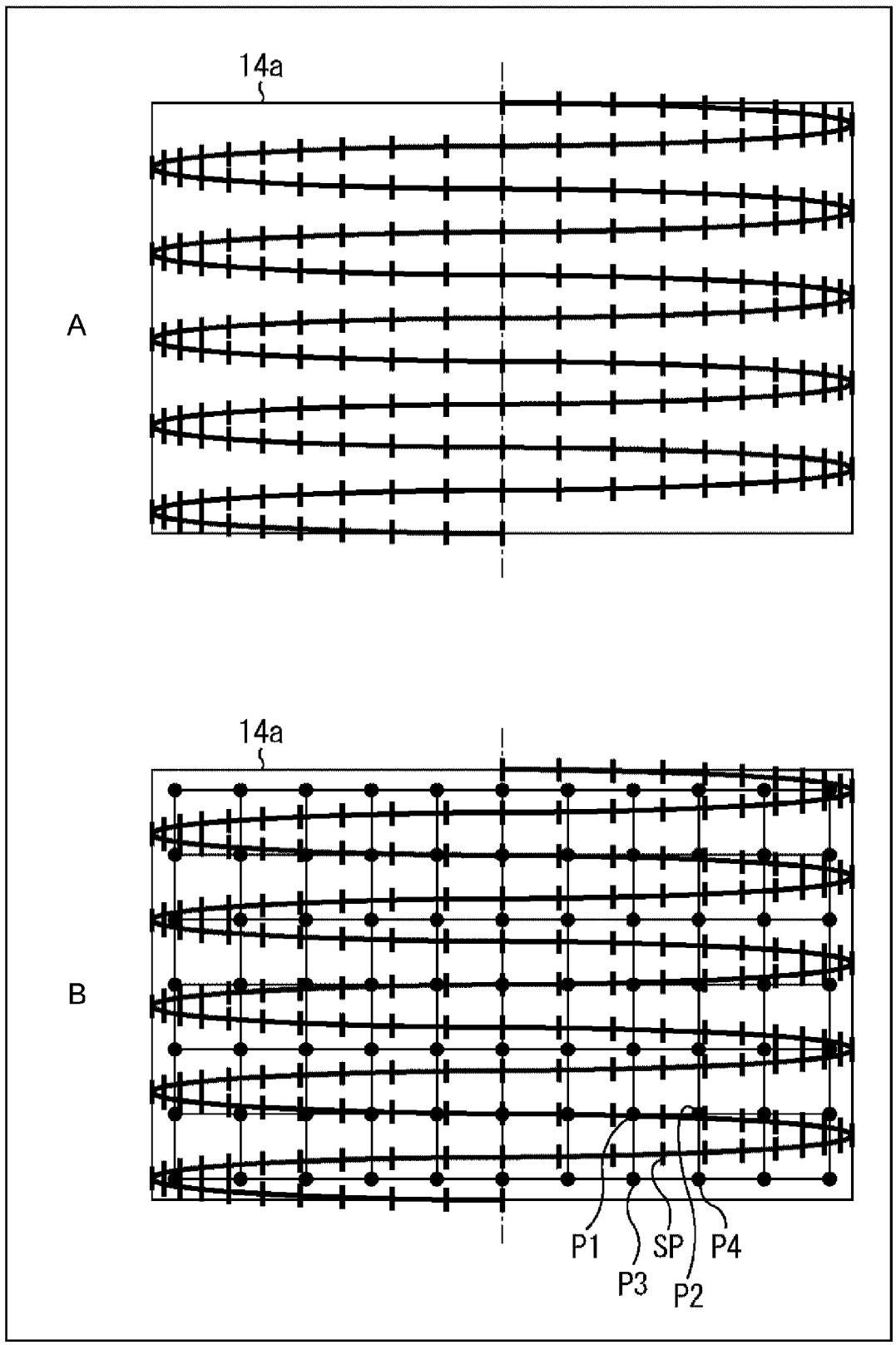
FIG. 6 is a diagram for explaining a relationship between a scanning trajectory of a laser beam and a pixel array according to an image signal standard.

With reference to FIG. 6, a relationship will be described between the scanning trajectory of the laser beam and the pixel array according to the image signal standard.

A of FIG. 6 illustrates the scanning trajectory of the laser beam, and B of FIG. 6 illustrates the scanning trajectory of the laser beam and the pixel array according to the image signal standard superimposed on each other. Incidentally, A of FIG. 6 and B of FIG. 6 illustrate an example of when the turning back portion of the scanning trajectory is used for projecting the projection image 14a.

In A of FIG. 6 and B of FIG. 6, rectangular dots arranged at a predetermined pitch on the scanning trajectory of the laser beam represent spot positions marked to a path of the sinusoidal horizontal scan signal H-Scan by a video clock synchronized with the horizontal scan signal H-Scan. That is, the spot positions indicate respective positions at which the laser beam is emitted at different timings according to the video clock and the spotlights are projected.

As described above with reference to FIG. 5, the scan speed of the laser beam is increased at the center of the projection image 14a (the screen 14), while the scan speed is decreased near the edge of the projection image 14a and the intervals between the scan lines toward the horizontal direction are uneven. For that reason, as illustrated in A of FIG. 6, density of the spot positions on the screen 14 is decreased (coarse) at the center of the projection image 14a, while the density is increased (dense) near the edge and intervals in the vertical direction between the spot positions are uneven.

In addition, in B of FIG. 6, round dots arranged in a lattice pattern represent pixels arranged in a pixel array according to the image signal standard. As illustrated in B of FIG. 6, the spot positions according to the scanning trajectory of the laser beam are greatly different from arrangement of the pixels according to the image signal standard, and are also uneven in terms of timing. For this reason, misalignment occurs for each pixel when the projection image 14a is projected.

Therefore, in the projector 11, pixels configuring the image data supplied as the input image signal are set as reference pixels, and, from (pixel values of) the reference pixels, interpolation processing is performed that interpolates a projection pixel projected at a spot position. Accordingly, it is possible to avoid that misalignment occurs for each pixel in the projection image 14a.

For example, a spot position SP illustrated in B of FIG. 6 will be described. In the projector 11, interpolation processing is performed that generates a pixel value of a projection pixel projected at the spot position SP, by two-dimensional interpolation according to the spot position SP, from pixel values of four reference pixels P1 to P4 near the spot position SP. Such interpolation processing is performed to all the spot positions, whereby it is possible to avoid that misalignment occurs for each pixel in the projection image 14a.

Incidentally, a pattern that selects the reference pixels referenced when the projection pixel is interpolated is not limited to the pattern that selects four reference pixels P1 to P4 as illustrated in B of FIG. 6, and various patterns can be adopted, such as a pattern that selects more reference pixels.

<Resolution>

Figure 7:
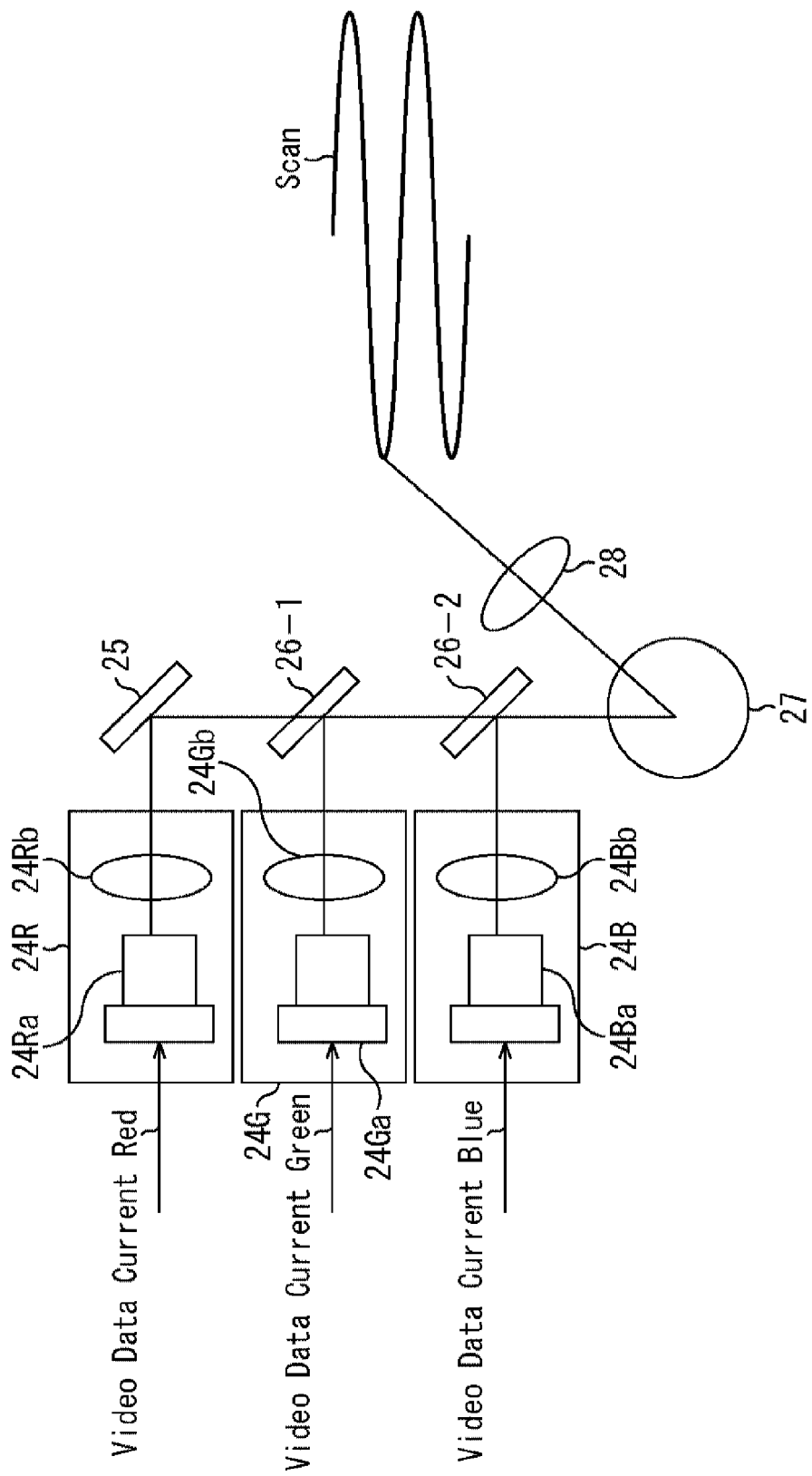
FIG. 7 is a diagram for describing a peripheral configuration of laser light source units 24R, 24G, and 24B in a general projector.

Next, in describing resolution of the projector 11 to which the present technology described above is applied, first, resolution of a general projector 11 will be described with reference to FIG. 7. FIG. 7 illustrates a configuration example illustrating in more detail a peripheral configuration of the laser light source units 24R, 24G, and 24B, the mirror 25, the dichroic mirrors 26-1 and 26-2, the drive mirror 27, and the optical lens 28, in the general projector 11. Incidentally, here, components other than the components illustrated in FIG. 7 are the same as those of the projector 11 in FIG. 4.

More specifically, the laser light source units 24R, 24G, and 24B respectively include laser beam generation units 24Ra, 24Ga, and 24Ba, and collimator lenses 24Rb, 24Gb, and 24Bb of corresponding wavelengths. That is, in the laser light source units 24R, 24G, and 24B, the laser beam generation units 24Ra, 24Ga, and 24Ba respectively generate laser beams of wavelengths specific to corresponding colors, and the collimator lenses 24Rb, 24Gb, and 24Bb collimate and output the laser beams of the respective wavelengths. Incidentally, regarding the laser beam generation units 24Ra, 24Ga, and 24Ba, and the collimator lenses 24Rb, 24Gb, and 24Bb, in a case where it is not necessary to distinguish the colors (wavelengths) from each other in particular, the laser beam generation units and the collimator lenses are simply referred to as a laser beam generation unit 24a, and a collimator lens 24b, respectively.

Then, on the basis of a red pixel signal (Video Data Current Red), emission direction of the red laser beam generated by the laser beam generation unit 24Ra is appropriately adjusted by the collimator lens 24Rb, and then the red laser beam is reflected by the mirror 25 and enters the dichroic mirror 26-1 from above of FIG. 7.

In addition, on the basis of a green pixel signal (Video Data Current Green), an emission direction of the green laser beam generated by the laser beam generation unit 24Ga is appropriately adjusted by the collimator lens 24Gb, and then the green laser beam is reflected by the dichroic mirror 26-1 and enters the dichroic mirror 26-2 from above of FIG. 7. At this time, the dichroic mirror 26-1 transmits the red laser beam entering from above of FIG. 7, and accordingly, the red laser beam enters the dichroic mirror 26-2 from above of FIG. 7.

Further, on the basis of a blue pixel signal (Video Data Current Blue), an emission direction of the blue laser beam generated by the laser beam generation unit 24Ba is appropriately adjusted by the collimator lens 24Bb, and then the blue laser beam is reflected by the dichroic mirror 26-2 and enters the drive mirror 27 from above of FIG. 7. At this time, the dichroic mirror 26-2 transmits the red and green laser beams entering from above of FIG. 7, and accordingly, the blue, red, and green laser beams enter the drive mirror 27 from above of FIG. 7. As a result, the red, green, and blue (R, G, and B) laser beams enter the drive mirror 27 in a multiplexed state, so that the laser beams are controlled as one scan line.

By the way, here, the number of scan lines of image output is determined by a relationship between a frame rate of an input image and a scan speed of the drive mirror 27. In a case where a period of a horizontal scan is 20 kHz, when one frame period is 60 Hz, 666 horizontal scan lines exist in back-and-forth for one frame.

Out of these scan lines, when blanking time of a vertical scan is 10%, the number of horizontal scan lines that can be used for displaying the projection image 14a for one frame is about 600, and the maximum resolution in the vertical direction is specified. At this time, it is necessary to increase a swing angle of the drive mirror 27 in the vertical direction such that the upper and lower scan lines are separated from each other. However, if the swing angle is increased too much, the upper and lower beams are separated from each other and a gap between the scan lines is formed in the image, so that it is desirable to adjust the swing angle to the optimum swing angle according to a beam spot diameter.

Figure 8:
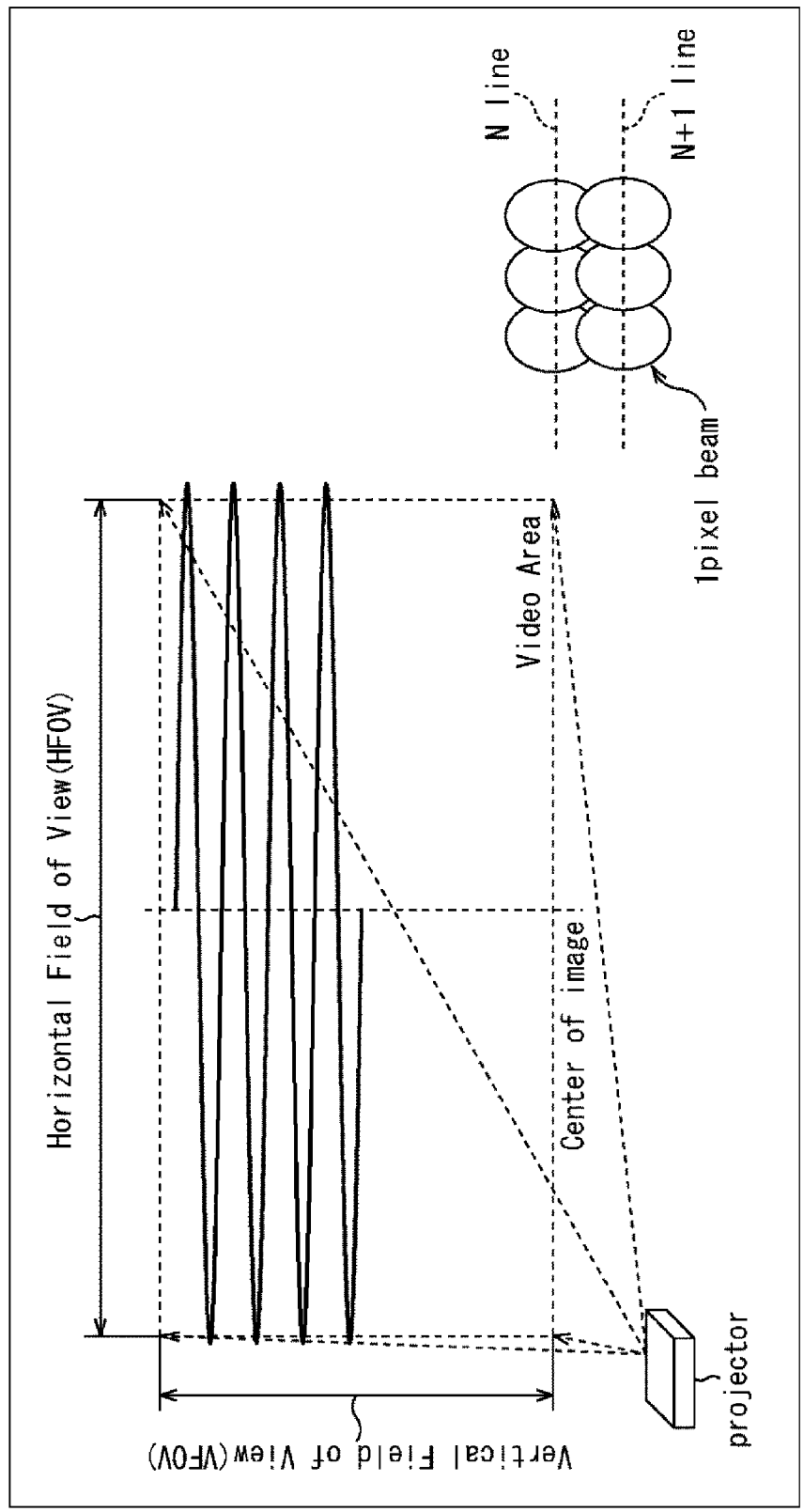
FIG. 8 is a diagram for describing resolution of a projection image by a peripheral configuration of the laser light source units 24R, 24G, and 24B that generate one system of the laser beam in the general projector.

For example, as illustrated in the left part of FIG. 8, when vertical resolution (the number of lines in the vertical direction) of the projection image 14a is Vres, and a vertical view angle is a Vertical Field of View (VFOV) (mm), an interval between vertical lines Vline_step is Vline_step=VFOV/Vres (mm). Here, the interval between vertical lines Vline_step needs to be a necessary and sufficient interval with respect to a beam spot diameter designed, as illustrated in the right part of FIG. 8. That is, it is necessary that, three beam spots of elliptical shape in N line (Nth line) in the right part of FIG. 8 and three beam spots in (N+1) line ((N+1)th line) do not overlap with each other in the vertical direction too much, and do not have an interval equal to or greater than a predetermined interval.

In addition, resolution in the horizontal direction of the projection image 14a is determined by a swing angle of the drive mirror 27 in the horizontal direction, the beam spot diameter, and modulation speed of the beam, and the swing angle needs to be sufficiently wide with respect to the beam spot diameter and the beam modulation speed. That is, as illustrated in the right part of FIG. 8, it is necessary that the beam spots do not overlap with each other in the horizontal direction too much, and the interval is less than the predetermined interval, as illustrated in three beam spots of each of N line and (N+1) line. Incidentally, a horizontal view angle in the left part of FIG. 8 is a Horizontal Field of View (HFOV) (mm).

In a case where the projection image 14a of 720p (horizontal direction 1280 pixels×vertical direction 720 pixels) is tried to be output in this condition, the vertical resolution is limited to 600 lines, so that an original image signal cannot be output with no compression. Therefore, when the image signal is compressed from 720 lines to 600 lines and the projection image 14a is output, the vertical resolution of the image signal is decreased and image quality is degraded. In addition, when 720 lines are tried to be output without scaling, it is necessary to improve the scan speed of the drive mirror 27 by about +20%.

However, there is a limit to the scan speed of the drive mirror 27, and as the resolution is increased, it is difficult to set the scan speed according to the resolution.

Therefore, it can be considered to increase the scanning path to improve the resolution, by increasing the laser beams of the laser light source units 24R, 24G, and 24B from one system to two or more systems to configure the systems such that the scanning paths shift from each other in the vertical direction.

<Configuration Example of Projector 11 to which Present Technology is Applied>

Next, with reference to FIG. 9, a peripheral configuration will be described of the laser light source units 24R, 24G, and 24B, the mirror 25, the dichroic mirrors 26-1 and 26-2, the drive mirror 27, and the optical lens 28, in the projector 11 to which the present technology is applied. Incidentally, in FIG. 9, components having the same functions of the components in FIGS. 4 and 7 are denoted by the same reference signs and the same names, and description thereof is omitted as appropriate.

Figure 9:
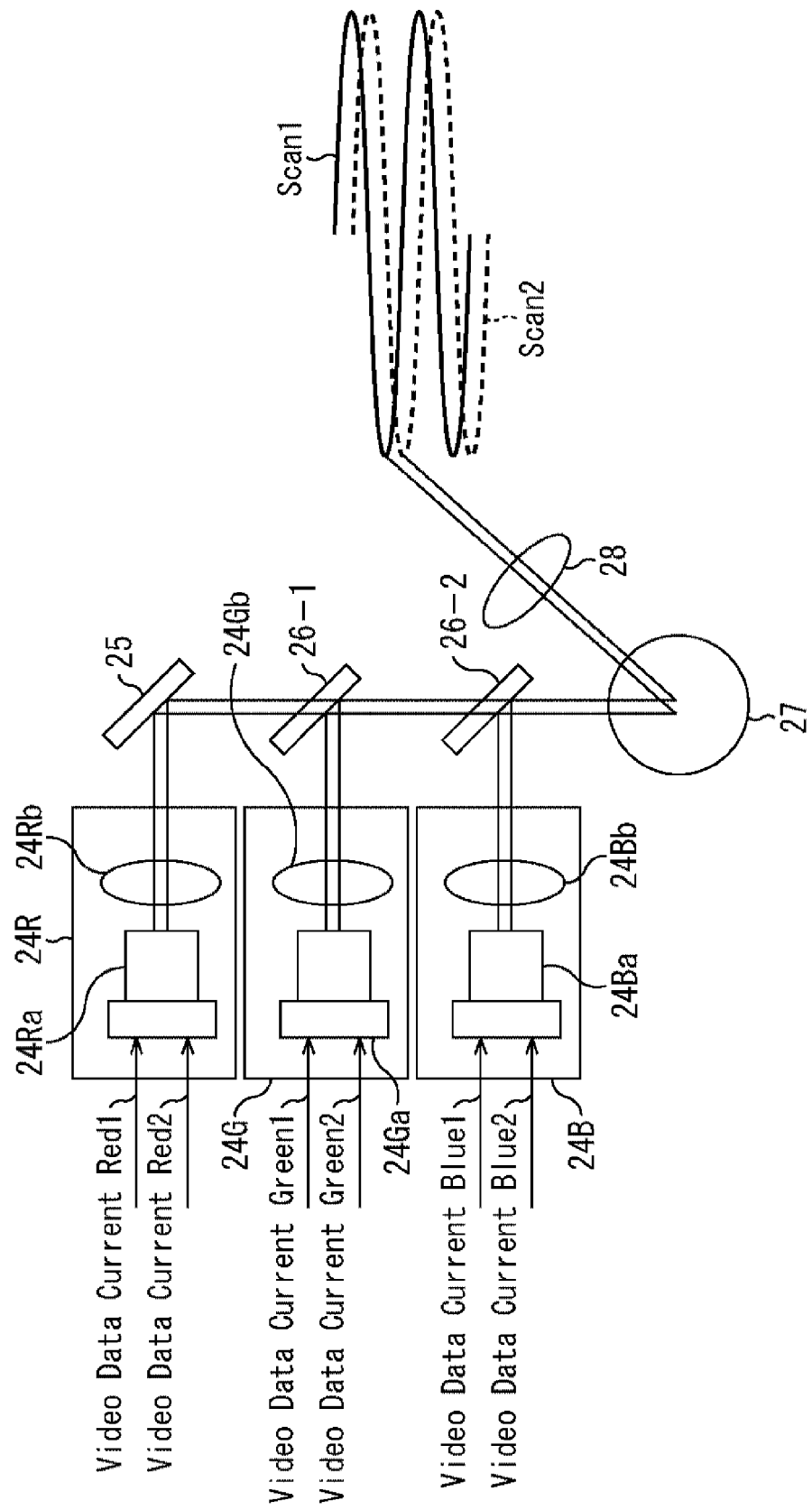
FIG. 9 is a diagram for describing a peripheral configuration of the laser light source units 24R, 24G, and 24B in a projector to which the present technology is applied.

That is, in the projector 11 to which the present technology is applied of FIG. 9, a difference from the general projector 11 of FIG. 7 is that the laser beams of the laser light source units 24R, 24G, and 24B are increased from one system to two or more systems to be configured such that the scanning paths shift from each other in the vertical direction on the screen 14, as illustrated in FIG. 9.

As illustrated in the left part of FIG. 9, differently from the laser light source units 24R, 24G, and 24B in FIG. 7, the laser light source units 24R, 24G, and 24B respectively receive two systems of the pixel signals of R, G, and B (Video Data Current Red1, 2, Video Data Current Green1, 2, Video Data Current Blue1, 2), and respectively emit two systems (two lines) of the laser beams that have a predetermined shift width in the vertical direction.

In this case, as illustrated in the right part of FIG. 9, two scanning paths (RGB line scanning), scan1 and scan2, are formed.

Figure 10:
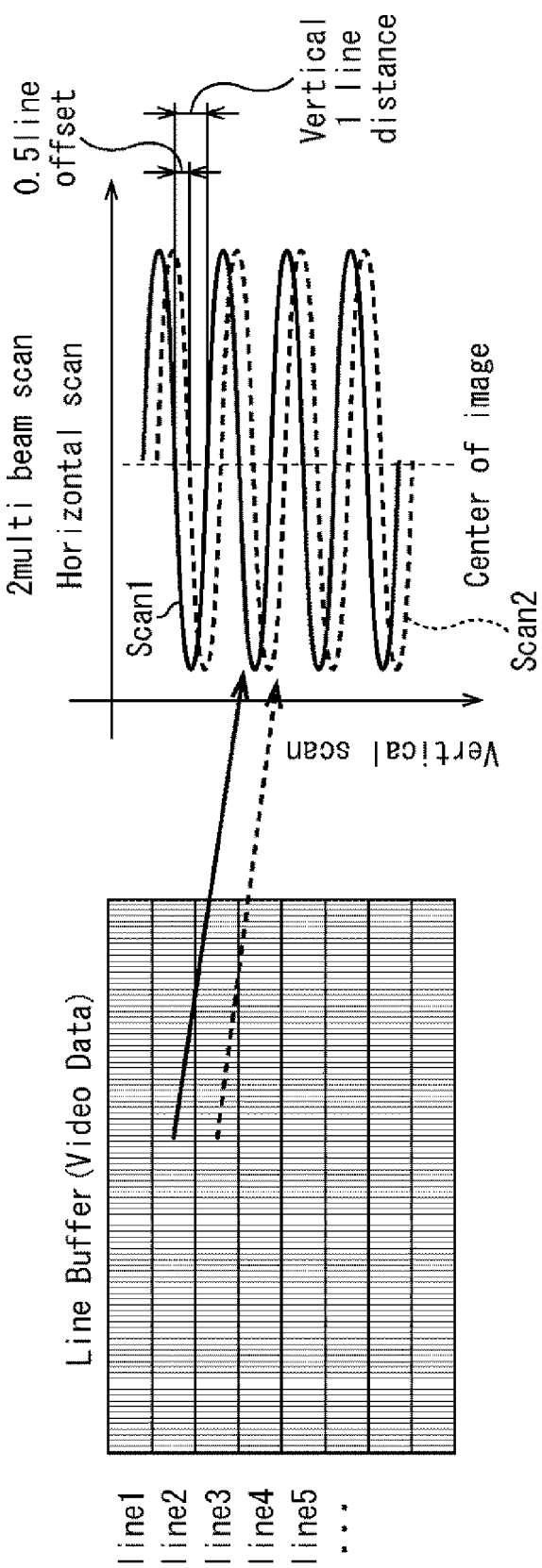
FIG. 10 is a diagram for describing resolution of a projection image by a peripheral configuration of the laser light source units 24R, 24G, and 24B that generate two systems of the laser beams in the projector to which the present technology is applied.

Here, regarding the pixel signals of R, G, and B (Video Data Current Red1, 2, Video Data Current Green1, 2, Video Data Current Blue1, 2), for example, from the pixel signals illustrated in the left part of FIG. 10 (Video Data Current Red1, Video Data Current Green1, Video Data Current Blue1), the scanning path scan1 is formed including a pixel signal of line2, as illustrated in the right part of FIG. 10. Similarly, from the pixel signals illustrated in the left part of FIG. 10 (Video Data Current Red2, Video Data Current Green2, Video Data Current Blue2), forming a scanning path scan2 is formed including a pixel signal of line3, as illustrated in the right part of FIG. 10.

In this case, an amount of shift between the scanning paths scan1 and scan2 is adjusted to be formed to be ½ (0.5 offset) of a scan interval (Vertical 1 line distance) in the vertical direction of the scanning path scan1, for example, as illustrated in the right part of FIG. 10. By performing adjustment in this way, scanning of the scanning paths scan1 and scan2 can be evenly performed.

As a result, by two systems of the scanning paths, the resolution in the vertical direction can be substantially doubled at the maximum theoretically.

Figure 11:
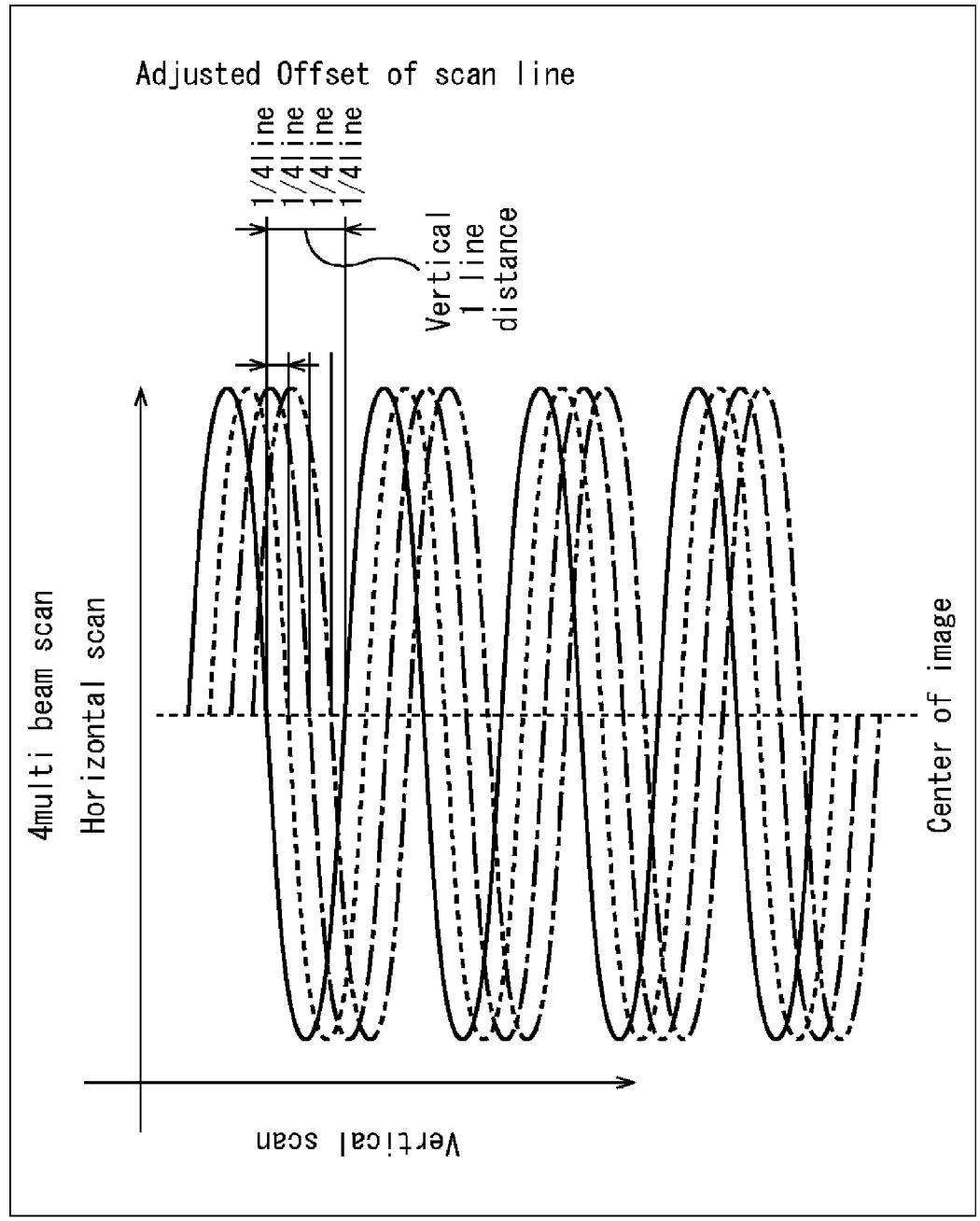
FIG. 11 is a diagram for describing resolution of a projection image by a peripheral configuration of the laser light source units 24R, 24G, and 24B that generate four systems of the laser beams in the projector to which the present technology is applied.

Similarly, by generating N laser beams emitted in the laser light source unit 24, N times as many scanning paths can be obtained. For example, in a case of N=4, as illustrated in FIG. 11, four scanning paths can be obtained. In this case, by setting ¼ of the amount of shift (¼ lines) for the scan interval (Vertical 1 line distance) in the vertical direction of one scanning path, the four scanning paths are arranged at equal intervals in the vertical direction.

<Configuration Example of Laser Beam Generation Unit 24a>

Next, with reference to FIG. 12, a configuration example will be described of the laser beam generation unit 24a in a case where two systems of the laser beams are generated.

Figure 12:
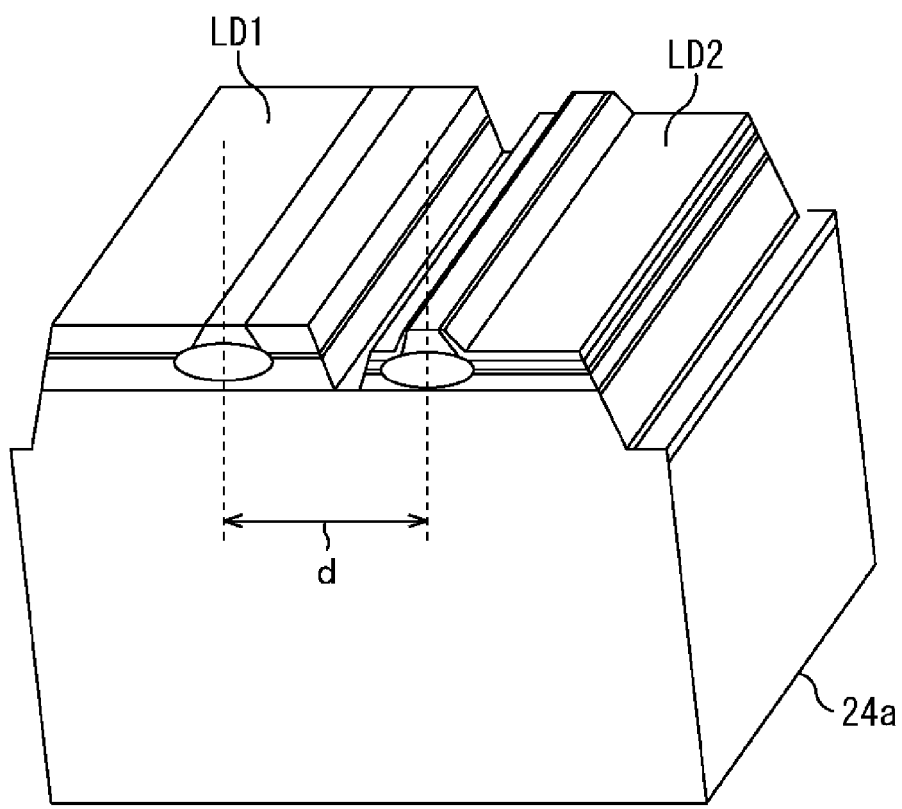
FIG. 12 is a diagram for describing a configuration example of a laser beam generation unit.

The laser beam generation unit 24a includes a monolithic multi-beam laser diode (LD) including two laser diodes LD1 and LD2, to shift the scanning path with high accuracy and keep the amount of shift, as illustrated in FIG. 12, and the optical axis is adjusted by the laser diodes LD1 and LD2.

In the monolithic multi-beam LD, the laser diodes LD1 and LD2 including a plurality of light-emitting devices having a light-emitting function of a stripe structure, are formed on a semiconductor substrate by photolithography. The monolithic multi-beam LD is integrally structured in a state where directions of the laser diodes LD1 and LD2 that are the light-emitting devices of the stripe structure are adjusted with high accuracy, so that the monolithic multi-beam LD is configured to be capable of adjusting a relative position of an emission point with high accuracy.

Therefore, in the monolithic multi-beam LD, an emission point interval between the laser diodes LD1 and LD2 appears as a shift on the screen 14. When the shift on the screen 14 is large, an area is narrow that improves the resolution in two scanning paths, so that the view angle of the projection image 14a decreases, and due to increase in blanking time, brightness of the projection image 14a decreases.

Figure 13:
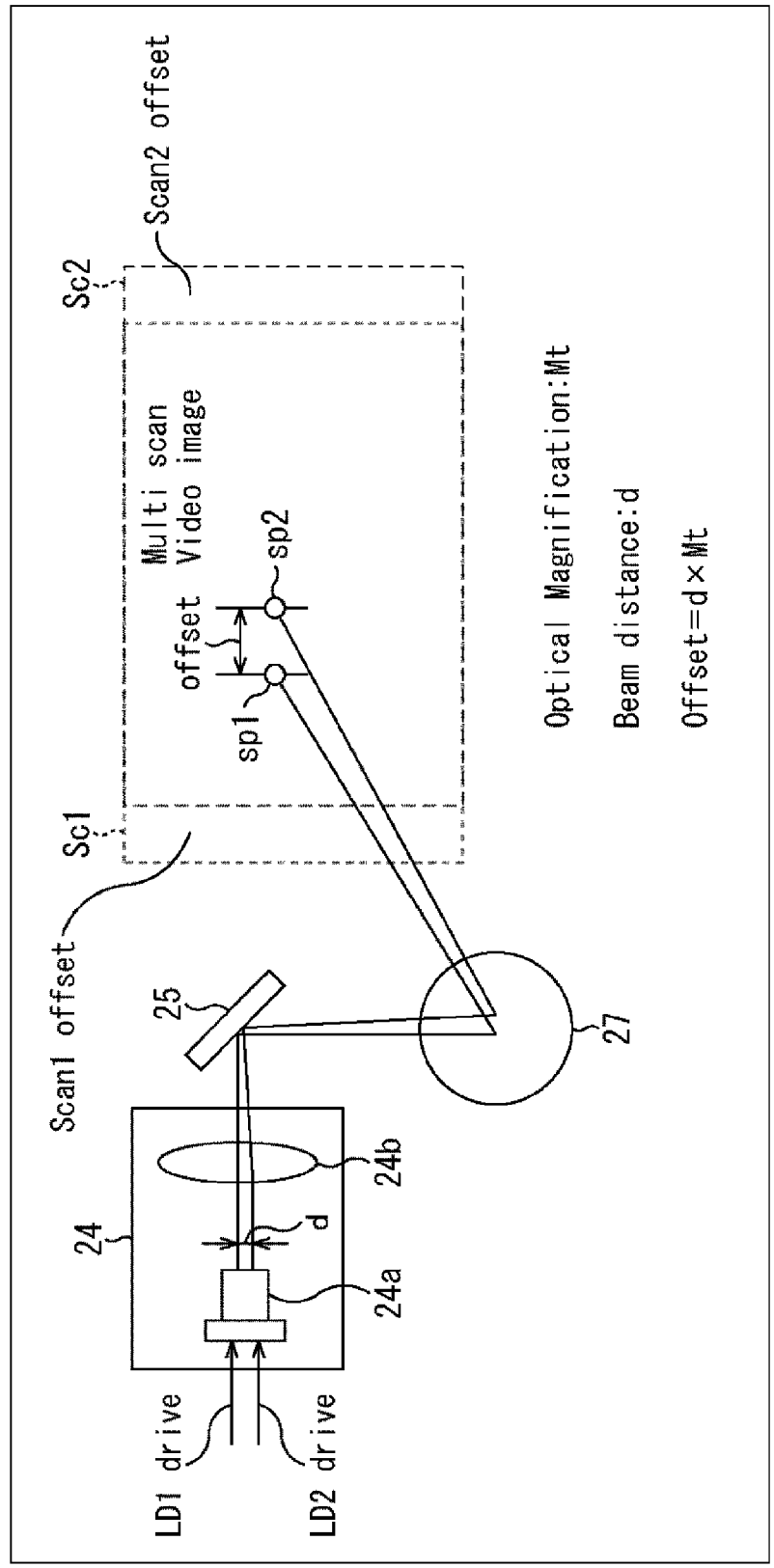
FIG. 13 is a diagram for describing a relationship between resolution and an amount of shift of two laser diodes in the laser beam generation unit.

Here, as illustrated in FIGS. 12 and 13, when the emission point interval between the laser diodes LD1 and LD2 is d (um), and optical magnification is Mt, an amount of shift offset between the laser spots SP1 and SP2 on the screen 14 is offset=d×Mt, as illustrated in FIG. 13. Here, ranges scanned by the scanning path Scan1 and the scanning path Scan2 are ranges Sc1 and Sc2, respectively, and in an area in which the ranges Sc1 and Sc2 overlap with each other, the resolution is doubled. However, when the amount of shift offset is an amount of shift in the horizontal direction, low resolution areas Scan1 offset and Scan2 offset are formed each having offset width, in which the ranges Sc1 and Sc2 scanned by the scanning path Scan1 and scanning path Scan2 do not overlap with each other, in the left and right on the screen 14. The low resolution areas Scan1 offset and Scan2 offset each having the offset width are areas in which image quality is degraded since both the resolution and brightness decrease to a half of those in a range in which the ranges Sc1 and Sc2 overlap with each other.

In a case where only a high resolution area is used, due to the low resolution areas Scan1 offset and Scan2 offset, blanking time in the horizontal direction increases, and it leads to a decrease in brightness (lm). For this reason, it is desirable to make the emission point interval d narrower, to reduce the blanking time as much as possible.

Meanwhile, there is also an influence that, due to the fact that the beam emission point interval d is short, heat interference occurs between beams, and emission power decreases, so that optimization is necessary. In a case where these are considered, the optimum interval of the emission point interval d is desirably about 5 to 50 um, for example.

In the laser beam generation unit 24a including the monolithic multi-beam LD, optical adjustment is necessary to adjust the amount of shift generated by a dimension between the laser diodes LD1 and LD2 to a desired shift of the scanning path.

Figure 14:
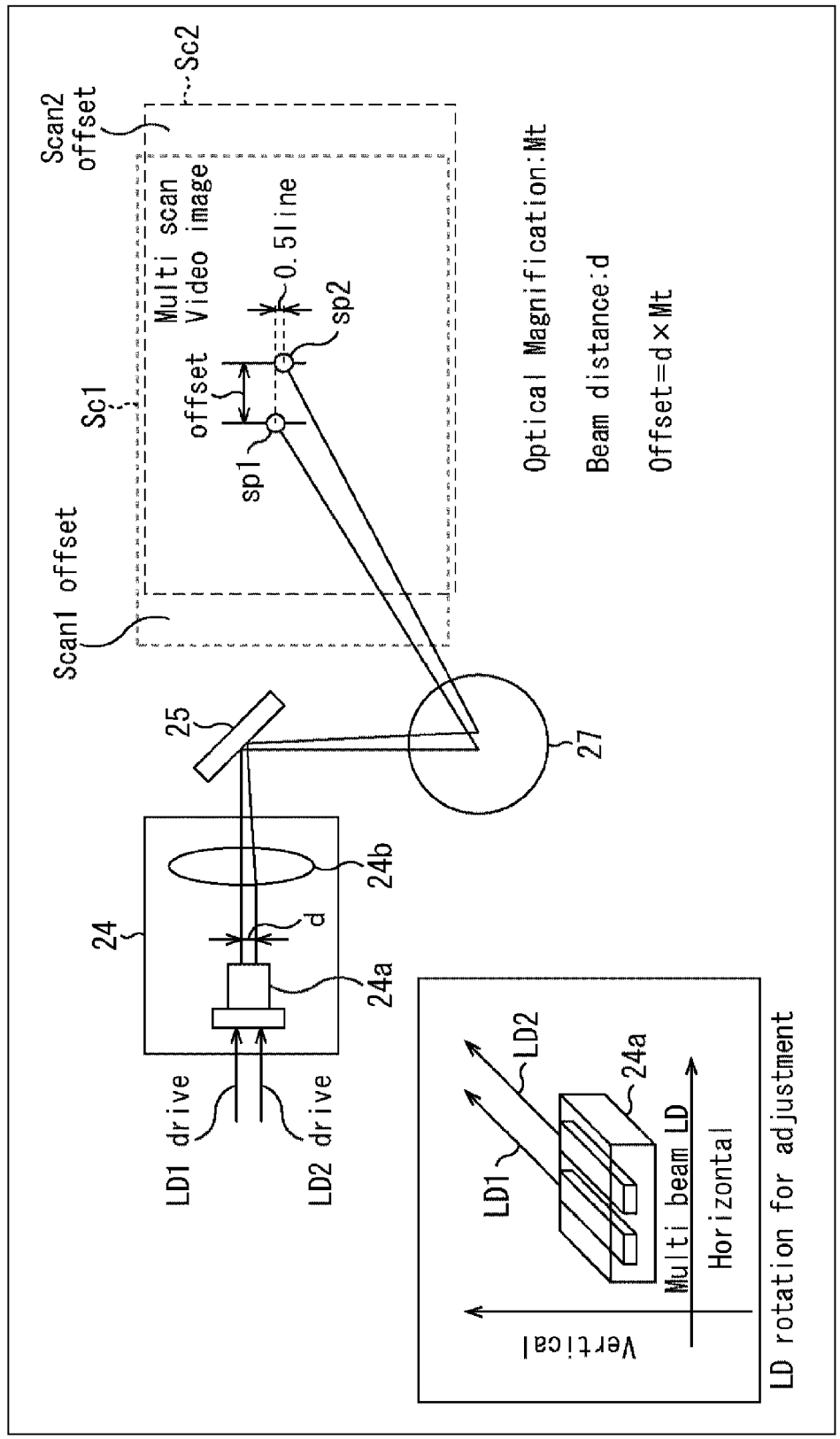
FIG. 14 is a diagram for describing a method for setting the amount of shift of the two laser diodes in the laser beam generation unit.

More specifically, for example, as illustrated in FIG. 14, there is an adjustment method that rotates the laser beam generation unit 24a and fixes the unit at a point where the amount of shift between the spots Sp1 and Sp2 on the screen 14 in the vertical direction is ½ lines (=0.5 lines). Here, when the view angle in the vertical direction is 450 mm and the number of horizontal scan lines (vertical resolution) of the projection image 14a is 600 lines, the interval Vline_step of 1 lne is Vline_step=450 mm/600 lines=0.75 mm/line.

In this case, by adjusting the interval in the Vertical Direction Between Two Scanning Paths to ½ lines, that is, 0.75 mm/2÷0.375 mm, the two scanning paths scan positions shifted by ½ lines to each other's scanning path, and different scanning paths can mutually fill gaps between vertical lines.

This adjustment is implemented for each of the laser beam generation units 24a of R, G, and B, and an RGB beam group having two different scanning paths is realized. The beams each shifted in the horizontal direction and the vertical direction are individually modulated by the pixel signal according to respective positions.

Figure 15:
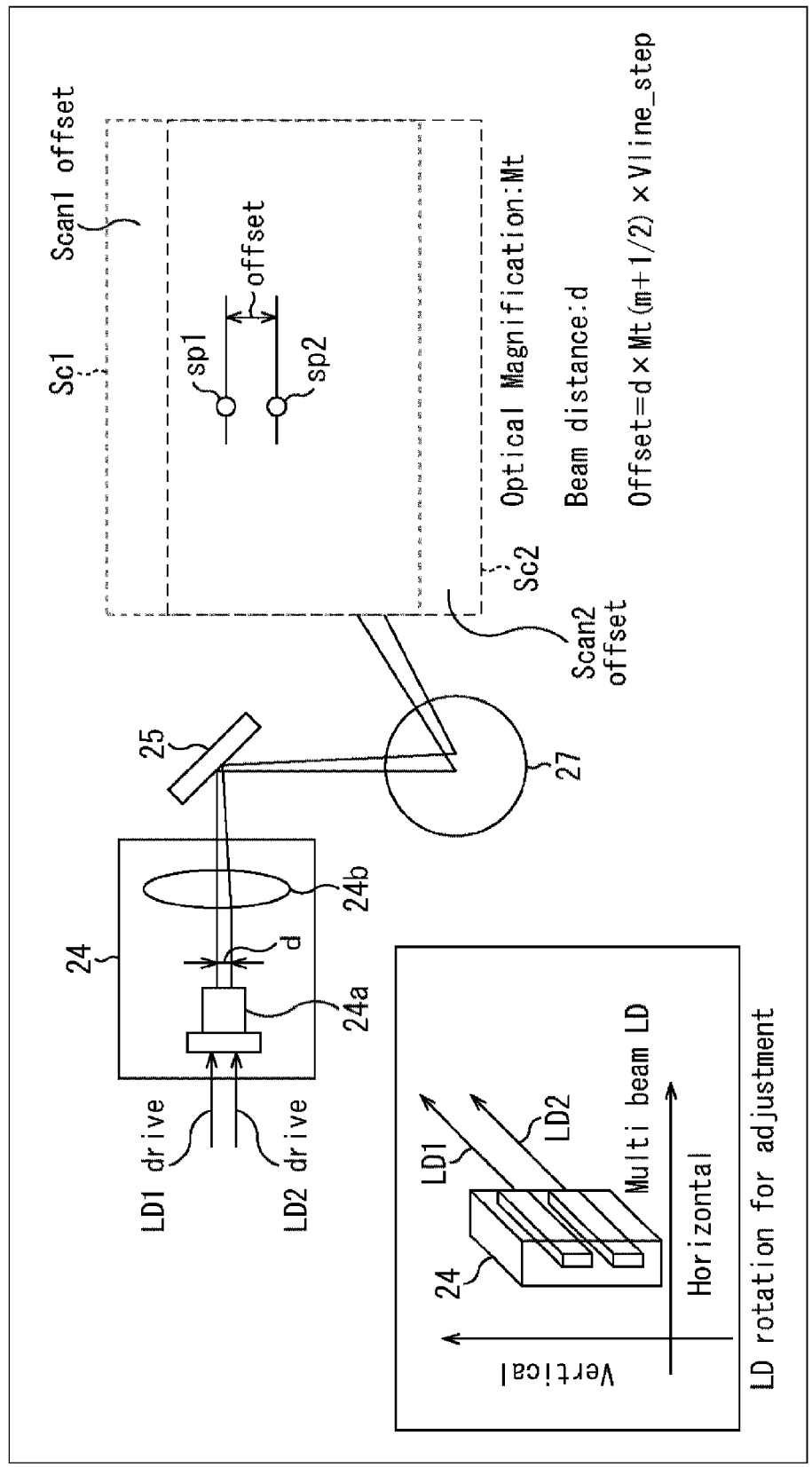
FIG. 15 is a diagram for describing a method for setting the amount of shift of the two laser diodes in the laser beam generation unit.

In addition, as illustrated in FIG. 15, design may be performed such that the emission point interval between the laser spots sp1 and sp2 projected on the screen 14 respectively by the laser diodes LD1 and LD2 of the laser beam generation units 24a, coincides with a vertical line shift.

Here, in a case where an amount of shift d is 10 um as the minimum dimension that can be realized as the interval between the laser diodes LD1 and LD2, further, the optical magnification is considered and the dimension is determined. For example, in a case where the optical magnification is Mt, when a relationship of Mt×d=m×Vline_step+½Vline_step is considered, the amount of shift d is d=(m+½)Vline_step/Mt. Here, m is a vertical scan line interval coefficient for adjusting an interval between vertical scan lines. At this time, by making the mount of shift d narrower, it is possible to make the low resolution areas Scan1 offset and Scan2 offset smaller, and it is possible to improve the resolution. Incidentally, in a case of this method, the shift between beams is small in the horizontal direction, and is a shift of (m+½) lines in the vertical direction.

Figure 16:
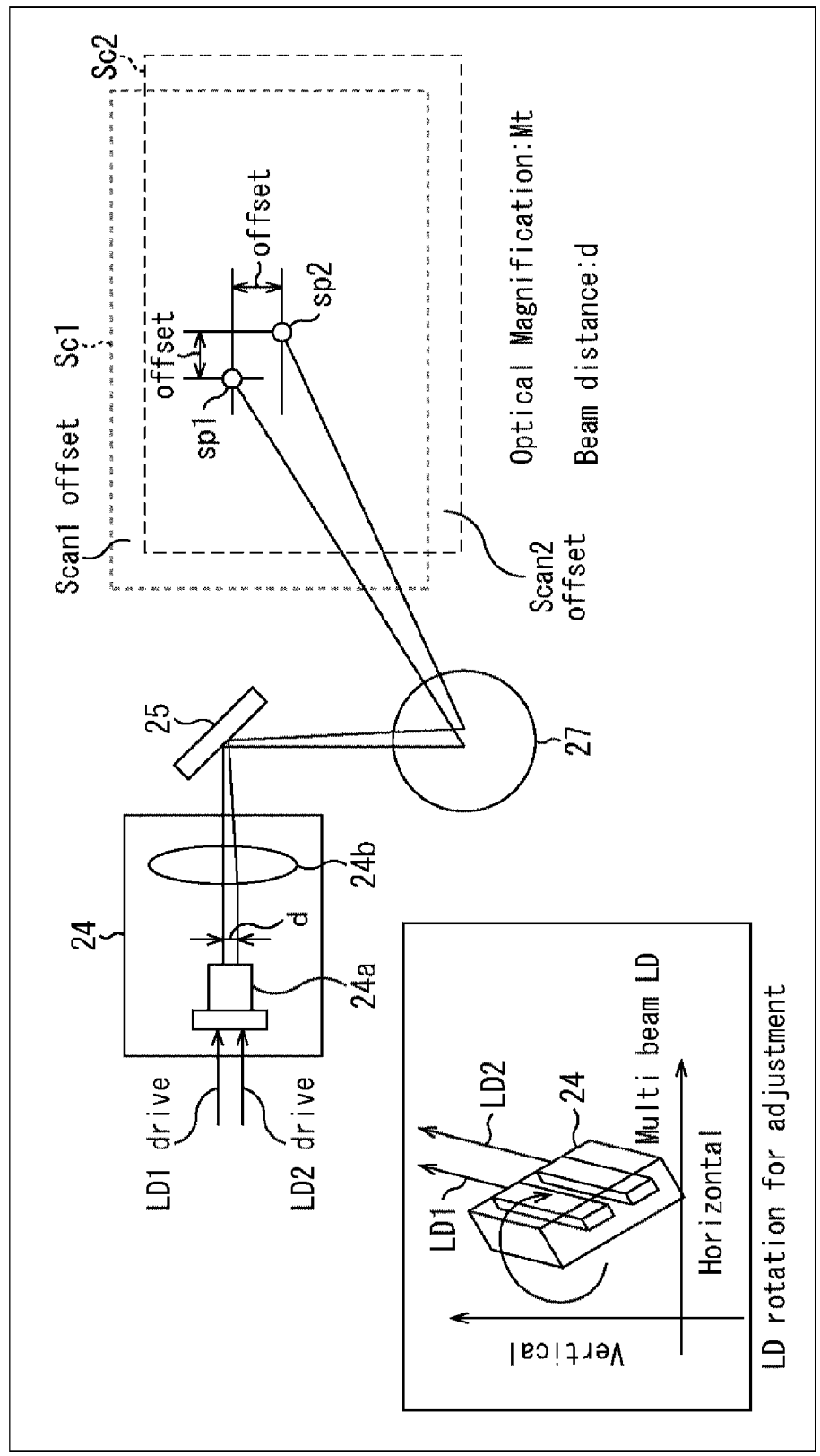
FIG. 16 is a diagram for describing a method for setting the amount of shift of the two laser diodes in the laser beam generation unit.

Further, as illustrated by an arrow in the lower left part of FIG. 16, the multi-beam LD may be rotated and obliquely arranged such that the emission point interval between the laser spots sp1 and sp2 projected on the screen 14 respectively by the laser diodes LD1 and LD2 of the laser beam generation units 24a, coincides with the vertical line shift.

In this case, in the low resolution areas Scan1 offset and Scan2 offset, blanking increases in both horizontal and vertical scan areas. An image memory necessary for correcting the projection image 14a desirably has the amount of shift in the vertical direction of ½ lines, as illustrated in FIG. 14.

Incidentally, the configuration of the laser beam generation units 24a does not have to be the monolithic multi-beam LD, and it is also possible in principle to improve the vertical resolution by using a plurality of single beam diodes respectively including the laser diodes LD1 and LD2, in a state of being bonded by an adhesive.

Figure 17:
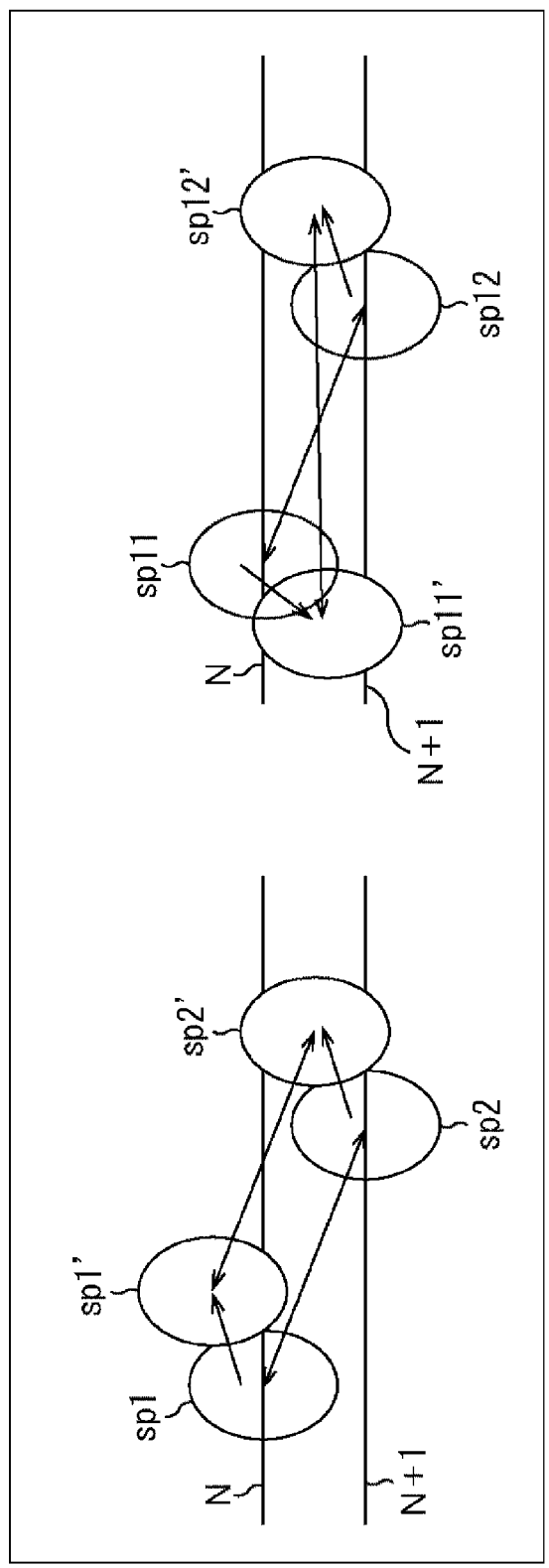
FIG. 17 is a diagram for describing difference in occurrence of shift between a case where the amount of shift of the two laser diodes in the laser beam generation unit is individually set and a case where the amount of shift is fixed.

However, in this case, fixing of the adhesive fluctuates due to thermal expansion caused by temperature actually, and the emission directions of the laser diodes LD1 and LD2 that should have been shifted shift randomly, and for example, as illustrated in the right part of FIG. 17, there is a possibility that correction is necessary to each beam according to the corresponding amount of shift. That is, in the right part of FIG. 17, although the emission directions of the laser diodes LD1 and LD2 have been set such that the laser spots sp11 and sp12 are obtained on the screen 14, there is a possibility that both laser spots independently and individually shift, as illustrated by laser spots sp11' and sp12'.

On the contrary, in a case of the laser beam generation units 24a using the monolithic multi-beam LD, even if shift occurs due to the temperature, regarding the emission directions of the laser diodes LD1 and LD2 using the same monolithic multi-beam LD, a constant interval is kept, and relative positions of the beams match with high accuracy. For this reason, even if shift occurs, as illustrated in the left part of FIG. 17, even if adjustment has been made originally such that laser spots sp1 and sp2 are projected on the screen 14, only a change to the laser spots sp1' and sp2' occurs, and a mutual relationship is kept, so that adjustment by correction is easier.

In addition, a range of the above-described vertical scan line interval coefficient m in (m+1/N) lines is determined from the vertical resolution realized, that is, the number of lines in the vertical direction.

For example, when the number of scan lines in the vertical direction usable for drawing the projection image 14a by one scanning path is Vline_single (the number of scan lines of VFOV (within image output range), the number of scan lines that can be realized by scanning with a plurality of systems of laser beams Vline_multi is represented as Vline_multi (lines)=(Vline_single−m)×N.

Here, an upper limit of the vertical scan line interval coefficient m is, when it is a condition for obtaining the resolution equal to or greater than Vline_single, represented as (Vline_single−m)×N≥Vline_single, so that the vertical scan line interval coefficient m is expressed as m≤Vline_single(1−1/N). Here, a lower limit of the vertical scan line interval coefficient m is a condition for maximizing the number of scan lines, so that m=0.

With the above configuration, it is possible to improve the resolution without changing the scan speed of the drive mirror 27, and it is possible to display the projection image 14a with higher accuracy. As a result, it is possible to increase the resolution of the projection image projected by the projector, and it is possible to realize improvement of image quality.

<Misalignment of Optical Axes of R, G, and B>

Next, misalignment will be described between optical axes of the respective laser light source units 24R, 24G, and 24B.

In the above, an example has been described of improving the resolution without changing the scan speed of the drive mirror by having two or more systems of the laser light source units 24R, 24G, and 24B. However, when the laser light source units 24R, 24G, and 24B are assembled, misalignment actually occurs in each optical axis in general, and when there are two or more systems of light sources of each color, there is a possibility that influence of bleeding increases.

Figure 18:
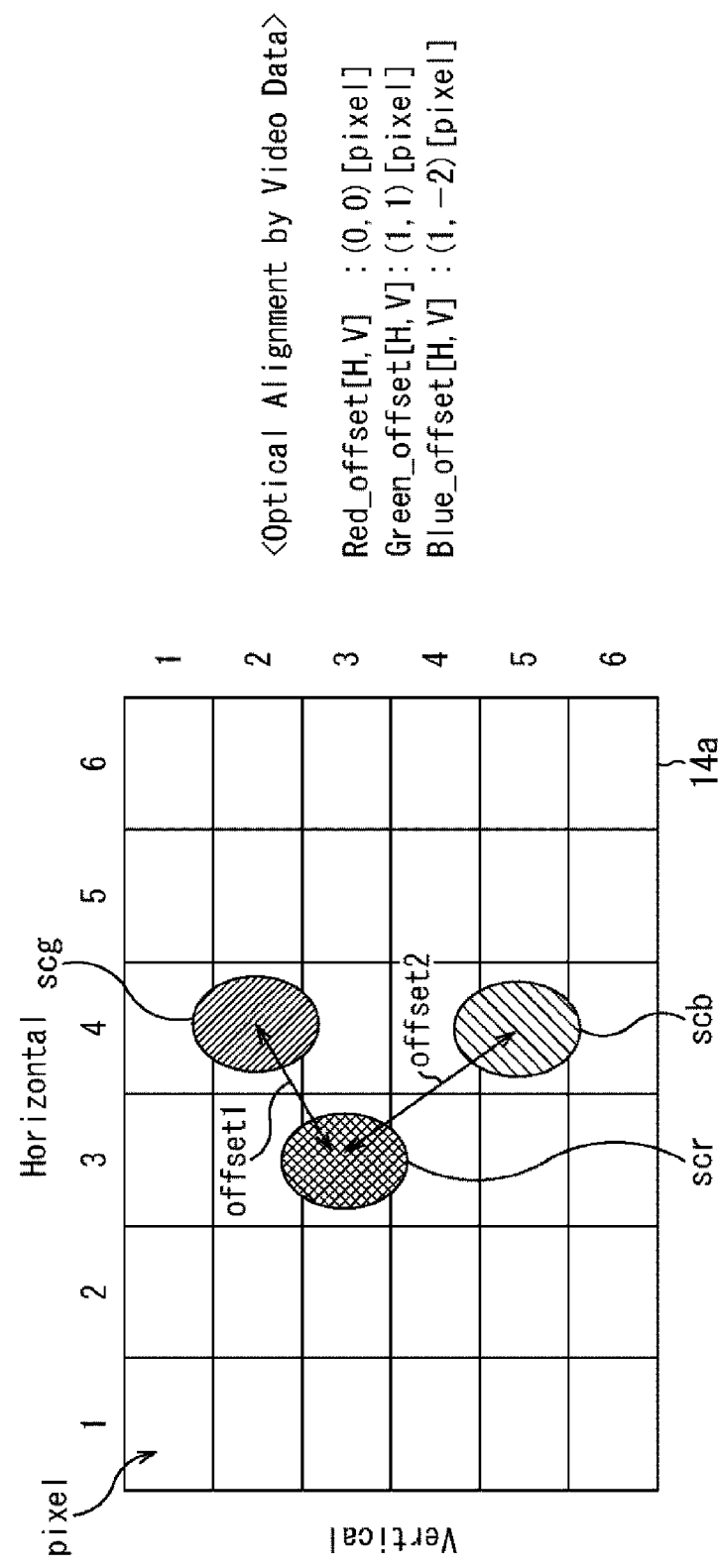
FIG. 18 is a diagram for describing a misalignment of a laser spot caused by a misalignment of an optical axis of the laser light source unit 24.

That is, in a case where there is one system of the laser light source units 24R, 24G, and 24B, even if the laser light source units 24R, 24G, and 24B are configured as illustrated in FIG. 7 and each optical axis is adjusted, misalignment occurs, whereby each of the laser spots may be emitted as illustrated in FIG. 18, for example.

FIG. 18 illustrates an example of laser spots scr, scg, and scb emitted on the screen 14 respectively by the laser light source units 24R, 24G, and 24B of FIG. 7, and each square indicates a pixel position. For example, in a case where the laser spot scr is used as a reference, an offset offset1 between the laser spot scr and the laser spot scg, and an offset offset2 between the laser spot scr and the laser spot scb are caused.

The offsets offset1 and offset2, when expressed by coordinates with the laser spot scr as the origin, are expressed as (1, 1) and (1, −2), respectively.

Figure 19:
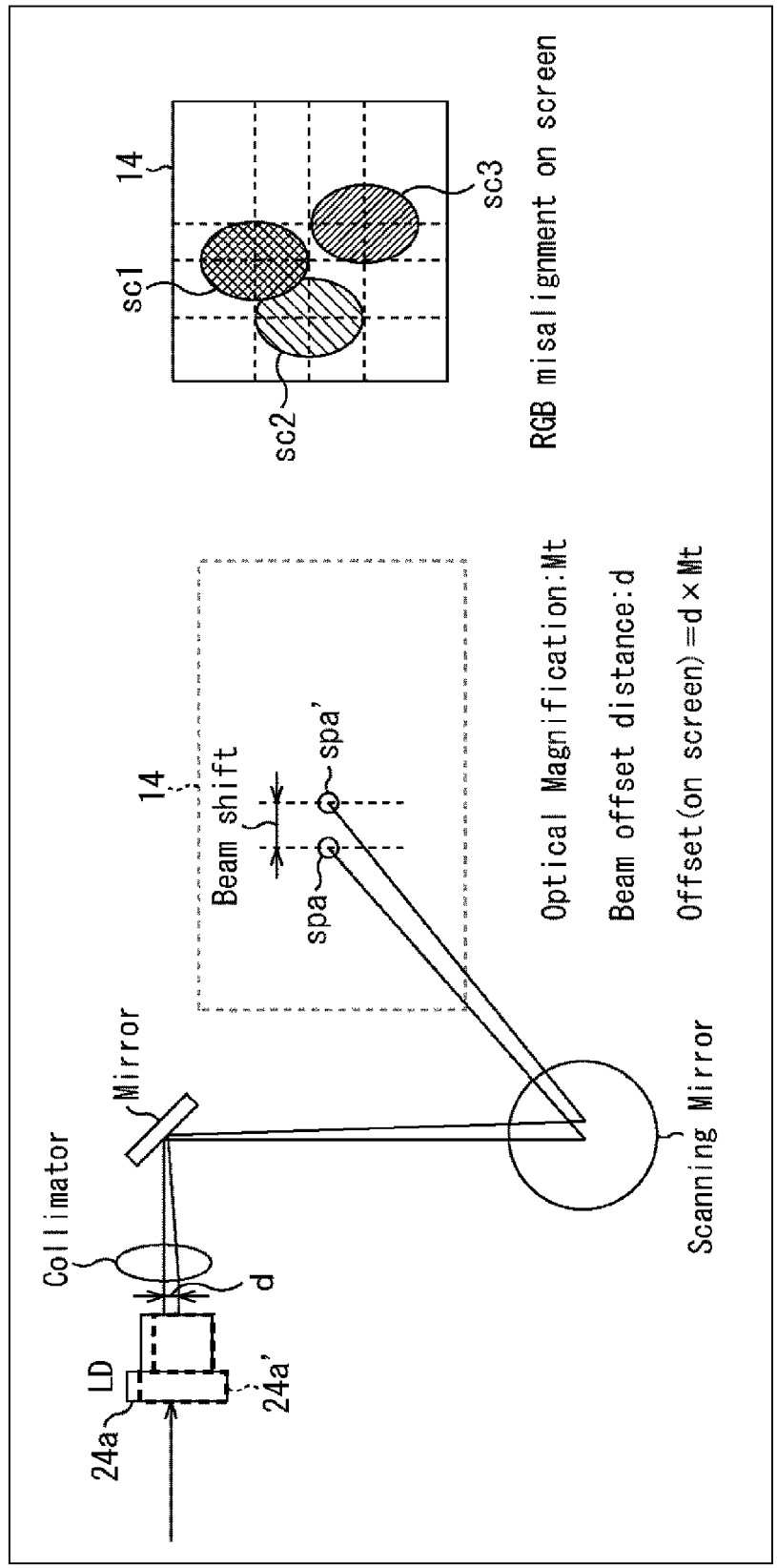
FIG. 19 is a diagram for describing the misalignment of the laser spot caused by the misalignment of the optical axis of each of the laser light source units 24R, 24G, and 24B.

More specifically, for example, as illustrated in the left part of FIG. 19, although the laser beam generation units 24a should have been provided in an original adjusted state, it may be provided in a state where an adjustment shift d is caused, as illustrated in the laser beam generation units 24a'. Accordingly, when the optical magnification up to the screen 14 is Mt, a shift Offset (Beam shift) (=Offset=d×Mt) is caused between beam spots spa and spa' on the screen 14. Therefore, such a shift is caused by each of the laser light source units 24R, 24G, and 24B, whereby laser spots sc1, sc2, and sc3 that should originally be projected on the same position may be projected on different positions as illustrated in the right part of FIG. 19, for example.

For example, the projection image 14a has a horizontal view angle of 800 mm, a vertical view angle of 450 mm, and is 720p (horizontal direction 1280 pixels×vertical 720 pixels (1 pixel=0.625 mm)), and the amount of shift d, 2 um, of the light source in a system of an optical magnification 500 becomes 1.0 mm on the screen and appears as a shift of 3.2 pixels, so that it results in a large image quality degradation.

Therefore, for example, the offsets (offset1, offset2) as illustrated in FIG. 18 are measured, the laser spot scr emitted by the laser light source unit 24R is used as the reference, and signals of pixels that should actually exist at positions as the offsets offset1 and offset2 of the laser light source units 24G and 24B, are corrected to be emitted respectively with the laser spot scg and scb, whereby misalignments of the optical axes of the laser light source units 24R, 24G, and 24B may be corrected.

<Configuration Example of Second Embodiment of Projector 11 to which Present Technology is Applied>

Next, with reference to FIG. 20, a configuration example will be described of a second embodiment of the projector 11 of present technology of FIG. 1, in which test emission is performed by the laser light source units 24R, 24G, and 24B, to detect misalignments of the optical axes, and when a pixel formed by a laser spot emitted by the laser light source unit 24R is used as a reference, pixel signals of positions obtained by relative offset1 and offset2 are projected as laser spots emitted by the laser light source units 24G and 24B, whereby the misalignment of each of the laser light source units 24R, 24G, and 24B is corrected. Incidentally, in FIG. 20, components having the same functions of the projector 11 of FIG. 4 are denoted by the same reference signs and the same names, and description thereof is omitted as appropriate.

Figure 4:
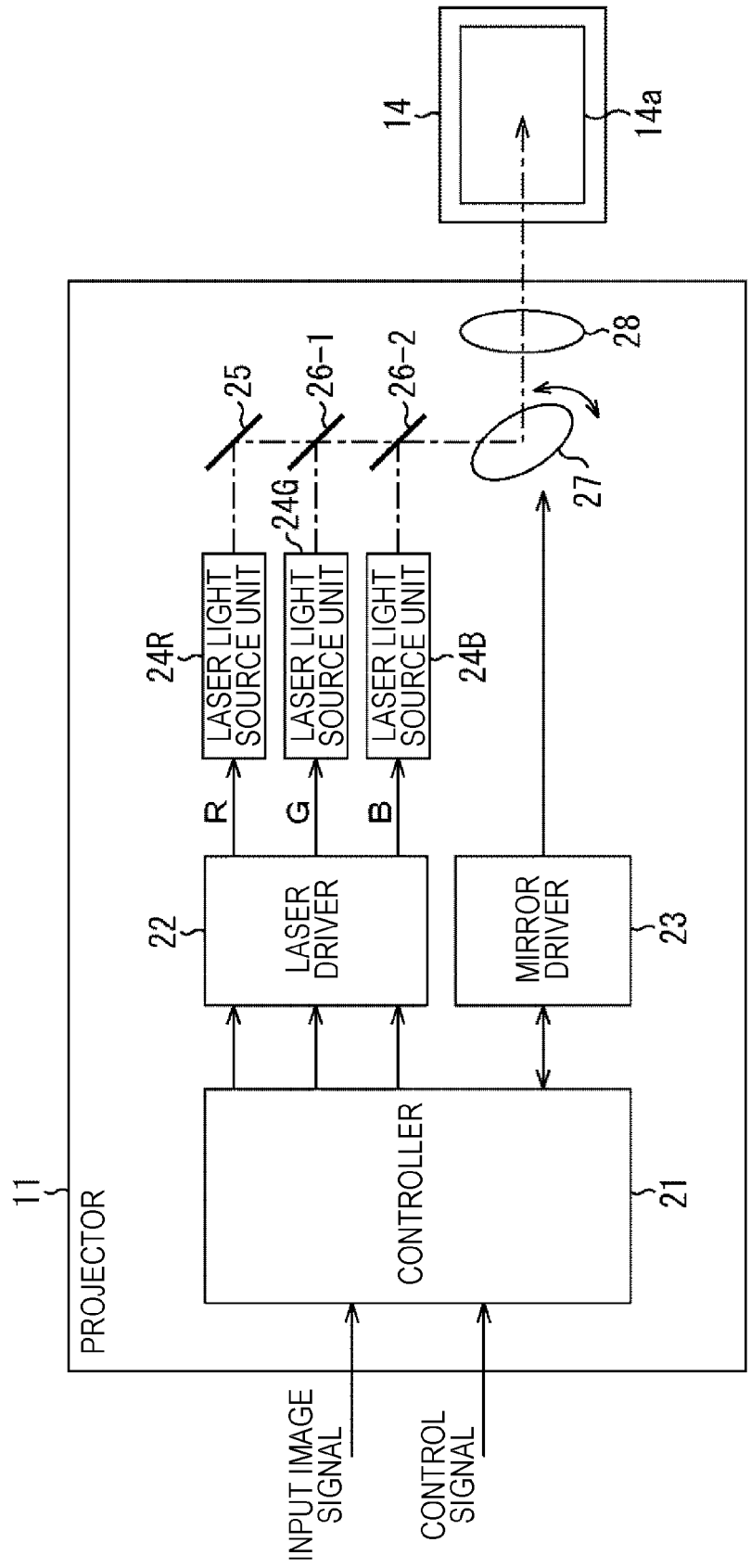
FIG. 4 is a block diagram illustrating a configuration example of a first embodiment of a projector of FIG. 1.
Figure 20:
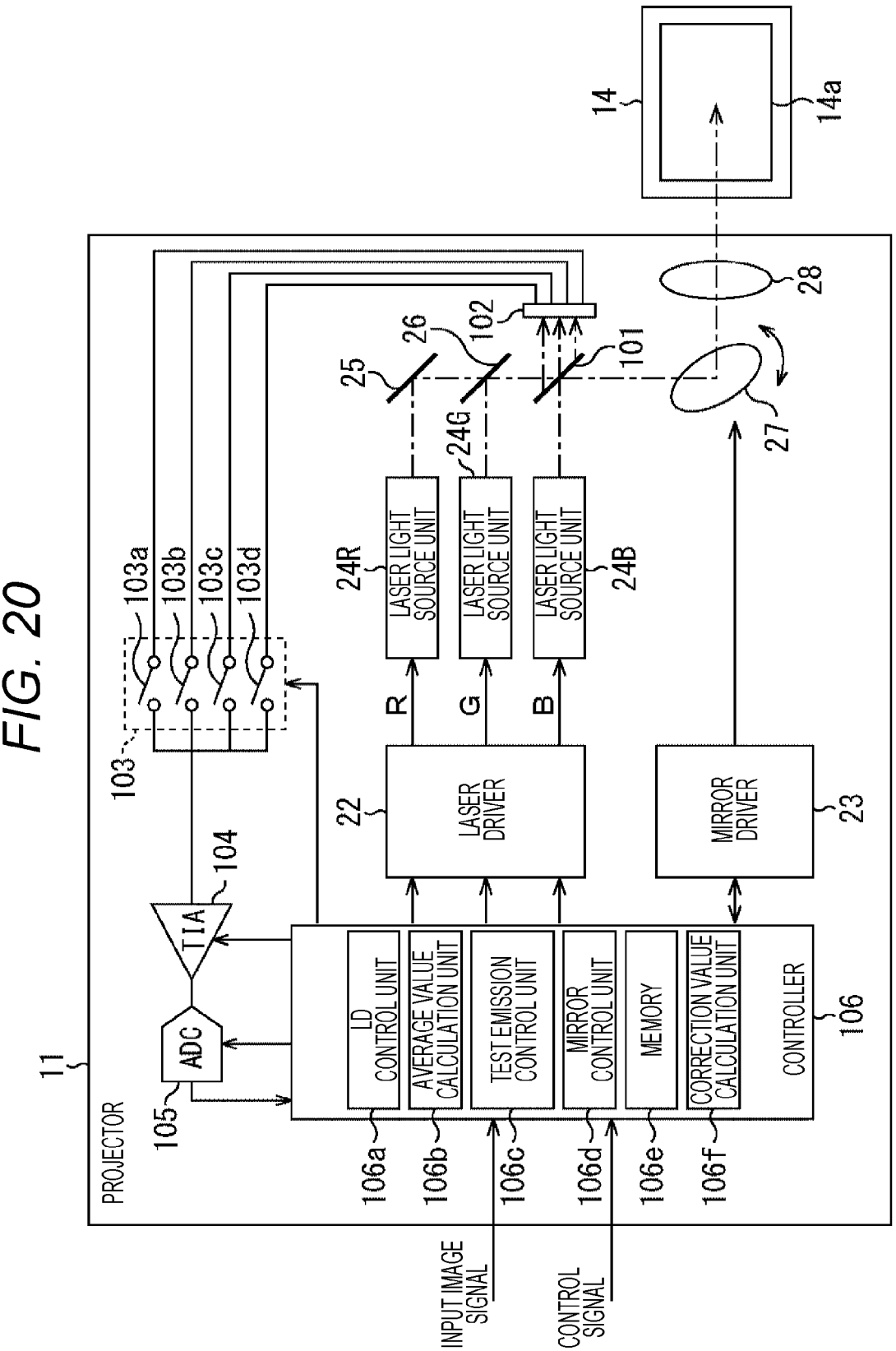
FIG. 20 is a block diagram illustrating a configuration example of a second embodiment of the projector of FIG. 1.

That is, in the projector 11 of FIG. 20, a difference from the projector 11 in FIG. 4 is that, instead of the dichroic mirror 26-2 and the controller 21, a beam splitter 101 and a controller 106 are provided, and further, a photodetector (PD) 102, a switching unit 103, a trance impedance amplifier (TIA) 104, and an analog digital converter (ADC) 105 are provided.

The beam splitter 101 reflects a part of the red laser beam toward the PD 102, reflects a part of the green laser beam toward the PD 102, and transmits a part of the blue laser beam toward the PD 102.

Figure 21:
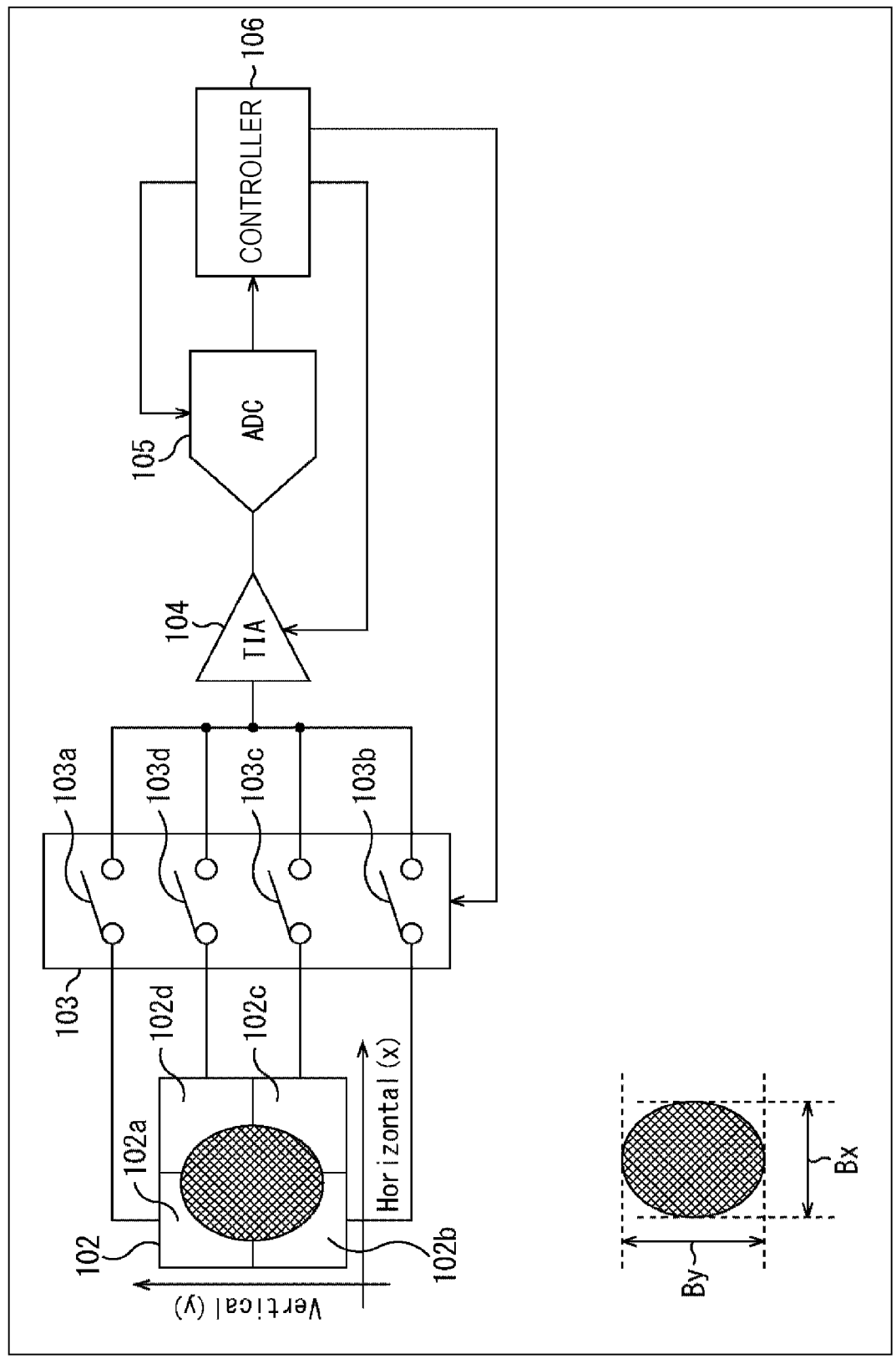
FIG. 21 is a diagram for describing a detailed configuration of a photodetector (PD) in a projector of FIG. 20.

The PD 102 is divided into a total of four areas, 2×2 areas 102a to 102d in the horizontal direction and the vertical direction, for example, as illustrated in FIG. 21, and each area generates a signal current according to an amount of light, and outputs the signal current to switches 103a to 103d of the switching unit 103. Incidentally, an ellipse in the PD 102 illustrates a spot shape of the laser beam entering the PD.

The switching unit 103 includes the switches 103a to 103d, and is controlled by the controller 106, and ON or OFF of each switch is controlled. Accordingly, the signal currents of the respective areas 102a to 102d of the PD 102 are switched and output to the TIA 104.

The TIA 104 is controlled by the controller 106, and converts the signal current into a signal voltage at a predetermined rate, and outputs the signal voltage to the ADC 105.

The ADC 105 converts the signal voltage of an analog signal supplied from the TIA 104 into a digital signal, and supplies the digital signal to the controller 106.

The controller 106 basically includes the same function as the controller 21, and further includes functions for controlling the switching unit 103 to the ADC 105 and correcting the shift. More specifically, the controller 106 includes an LD control unit 106a, an average value calculation unit 106b, a test emission control unit 106c, a mirror control unit 106d, a memory 106e, and a correction value calculation unit 106f.

The LD control unit 106a uses a correction value for correcting each of the misalignments of the optical axes of the laser light source units 24R, 24G, and 24B calculated by the correction value calculation unit 106f, stored in the memory 106e, and controls the laser driver 22 such that pixel signals of pixel positions in an input image signal are corrected to pixel signals of pixel positions actually projected to be shifted due to the misalignment of the optical axis, and emitted. In addition, the LD control unit 106a uses a correction value for correcting a difference between an expected value and a detected value in light output of each of the laser light source units 24R, 24G, and 24B calculated by the correction value calculation unit 106f, stored in the memory 106e, and controls the laser driver 22 such that the pixel signals of the pixel positions in the input image signal are emitted such that light output of a pixel actually projected is light output of the expected value. That is, the LD control unit 106a uses two correction values of the correction value for correcting the misalignment of the optical axis and the correction value for correcting the light output, controls the laser driver 22 to correct the optical axis misalignment and the light output, and causes the laser beams to be emitted by the laser light source units 24R, 24G, and 24B.

The average value calculation unit 106*b* calculates an average value of brightness on a frame-by-frame basis of the pixel signal output by the LD control unit 106*a*, and supplies the average value to the test emission control unit 106*c*.

The test emission control unit 106*c*, on the basis of the mirror synchronization signal that is supplied by the mirror control unit 106*d* and by which the mirror driver 23 is controlled, specifies an operating direction of the drive mirror 27, determines timing at which the test emission should be performed for calculating the correction value, and outputs a command to the LD control unit 106*a* such that the test emission is performed with emission intensity according to the average value of brightness of a frame supplied by the average value calculation unit 106*b*. At this time, the test emission control unit 106*c* controls ON or OFF of the switches 103*a* to 103*d* in the switching unit 103, controls an amplification rate of the TIA 104, and further controls measurement timing of a voltage signal by the ADC 105.

The correction value calculation unit 106*f*, on the basis of the signal voltage of each area of the areas 102*a* to 102*d* that is received by the PD 102 by test emission of each of the laser light source units 24R, 24G, and 24B and measured by the ADC 105, specifies a position of each laser beam, obtains an offset from a mutual position relationship, calculates a correction value for correcting the optical axis misalignment according to the offset, and stores the correction value in the memory 106*e* as correction information. In addition, the correction value calculation unit 106*f*, on the basis of the signal voltage of each area of the areas 102*a* to 102*d* that is received by the PD 102 by test emission of each of the laser light source units 24R, 24G, and 24B and measured by the ADC 105, specifies light output of the laser beam, calculates a correction value for correcting the difference between the expected value and light output actually projected in accordance with a difference (shift) from an expected value, and stores the correction value in the memory 106*e* as the correction information.

<Emission Control Processing>

Figure 22:
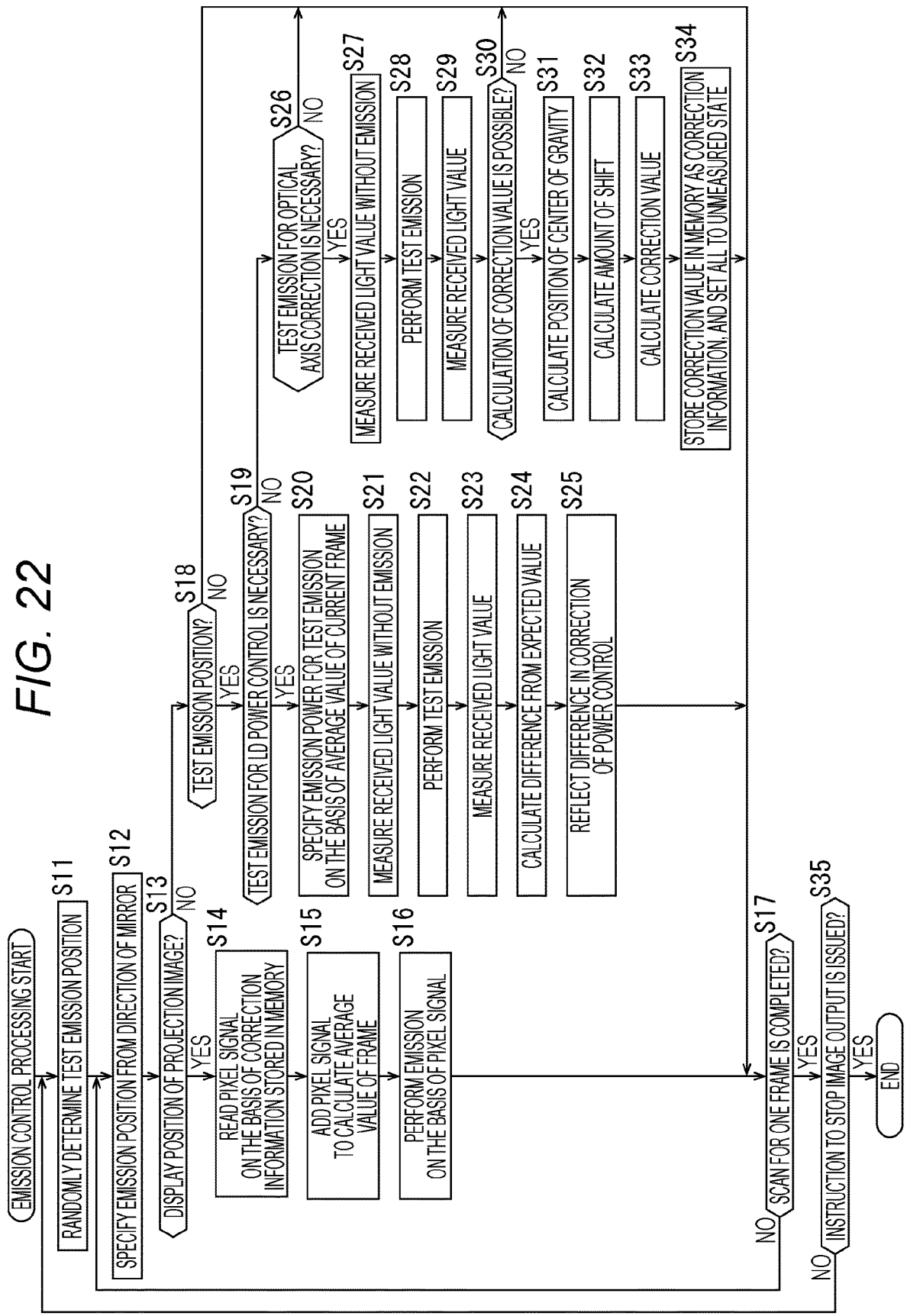
FIG. 22 is a flowchart for describing emission control processing in the projector of FIG. 20.

Next, with reference to a flowchart of FIG. 22, emission control processing will be described in the projector 11 of FIG. 20.

In starting projection on the screen by inputting the input image signal and scanning by the raster scan according to the sequential pixel signal, processing is started from a state where the drive mirror 27 is tilted to be able to perform projection to a tip of the scanning path.

Figure 23:
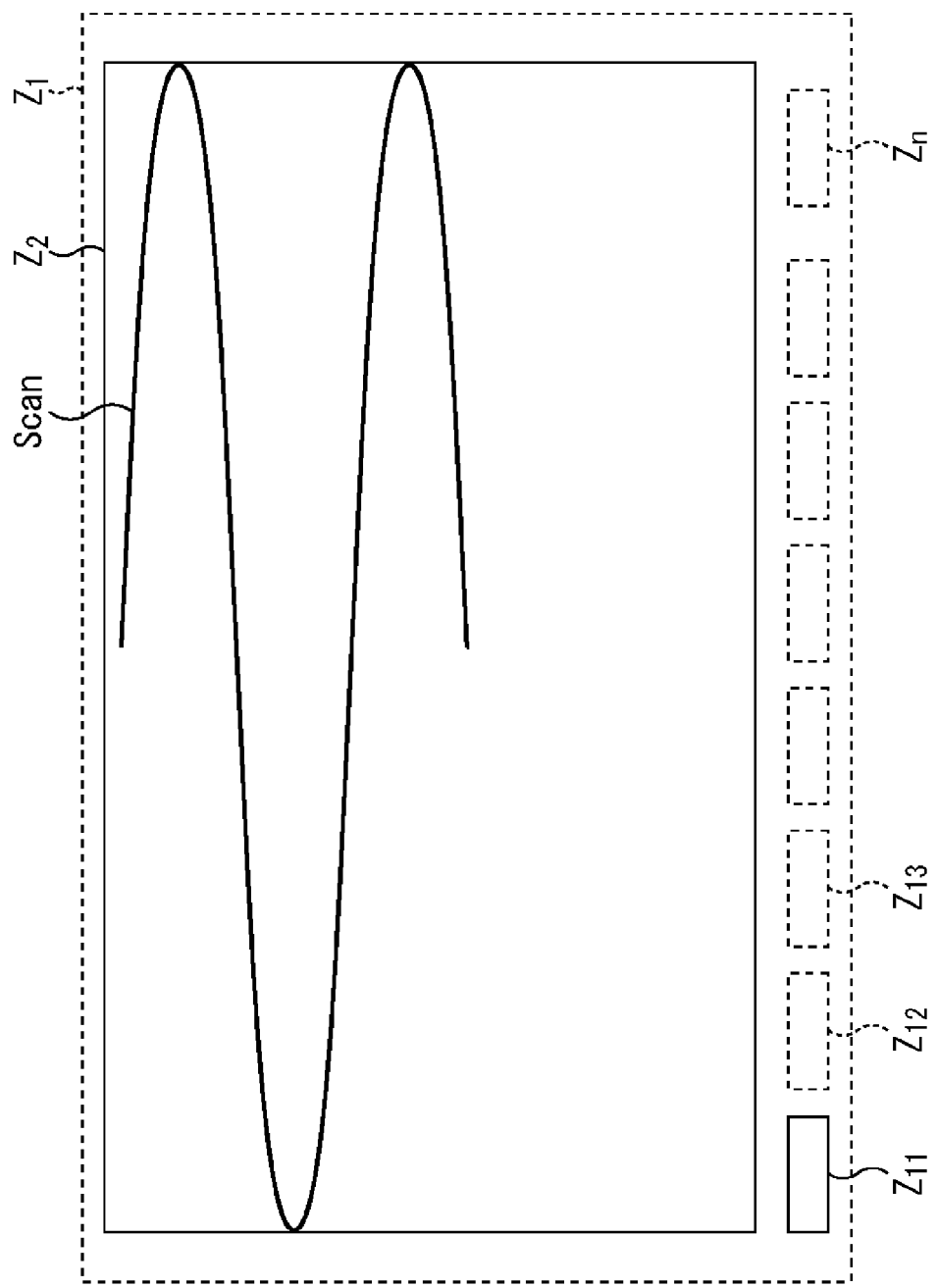
FIG. 23 is a diagram for describing a test emission position.

In step S11, the test emission control unit 106*c* randomly sets a test emission position. The test emission position is set to any of blanking areas around the projection image 14*a* by operation of the drive mirror 27. For example, as illustrated in FIG. 23, any area of areas Z11 to Z*n* is set as the test emission position, which is an area around an area Z2 where the image is actually configured in an area Z1 where the projection image 14*a* can be configured. That is, the area other than the area Z2 in the area Z1 is an area that is difficult to notice by a viewer during viewing, so that the laser spot is difficult to recognize even if emitted for test emission. Therefore, for example, any area of the areas Z11 to Z*n* is randomly set as the test emission position.

In step S12, the test emission control unit 106*c* and the LD control unit 106*a* perform inquiry to the mirror control unit 106*d* to specify a scan position from a current emission direction of the drive mirror 27.

In step S13, the test emission control unit 106*c* determines whether or not the scan position is a display area of the projection image 14*a*. In step S13, in a case where the scan position is the display area of the projection image 14*a*, the processing proceeds to step S14.

In step S14, the LD control unit 106*a*, on the basis of the correction value stored in the memory 106*e*, corrects the pixel position to be projected as the input image signal in accordance with the misalignment of the optical axis of each of the laser light source units 24R, 24G, and 24B.

In step S15, the average value calculation unit 106*b* extracts brightness from the image signal of the pixel position corrected, and performs addition for calculating the average value of brightness of the pixel signal of one frame.

In step S16, the LD control unit 106*a* controls the laser driver 22, and on the basis of the input image signal, causes the pixel signal in which the pixel position is corrected to be emitted by the laser light source units 24R, 24G, and 24B.

In step S17, the mirror control unit 106*d* determines whether or not scan for one frame is completed, and in a case where the scan is not completed, the processing returns to step S12. That is, the processing from step S12 to step S34 is repeated until the processing for one frame is completed. Then, in step S17, when it is regarded that the processing for one frame is completed, at that timing, the emission direction of the drive mirror 27 is changed by a predetermined angle toward a frame start position for preparing image output of the next frame, and the processing proceeds to step S35.

In addition, in step S35, the LD control unit 106*a* determines whether or not an instruction to stop image output control is issued, and in a case no instruction to stop is issued, the processing returns to step S11. Then, in step S35, in a case where it is determined that the instruction to stop image output is issued, the processing is ended.

On the other hand, in step S13, in a case where the scan position is not the display area of the projection image 14*a*, the processing proceeds to step S18.

In step S18, the test emission control unit 106*c* determines whether or not the scan position specified by inquiry to the mirror control unit 106*d* is within the area determined as the test emission position.

In step S18, in a case where it is determined that the scan position specified is not within the area determined as the test emission position, the test emission is not performed, and the processing proceeds to step S17.

In step S18, in a case where it is determined that the scan position is the test emission position, the processing proceeds to step S19.

In step S19, the LD control unit 106*a* determines whether or not it is necessary to execute test emission for LD power control in any of the laser light source units 24R, 24G, and 24B. In step S19, for example, when the test emission for LD power control is not performed in the same frame, it is determined that it is necessary to execute the test emission for LD power control. In such a case, the processing proceeds to step S20.

Figure 24:
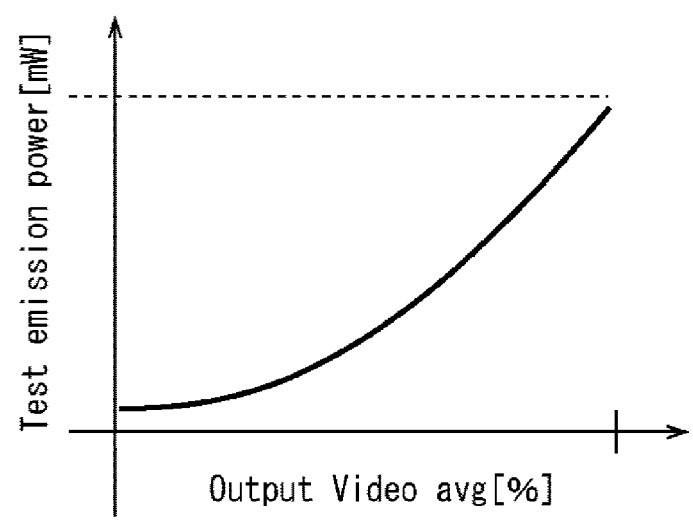
FIG. 24 is a diagram for describing a method for setting emission intensity of test emission.

In step S20, the test emission control unit 106*c* controls the average value calculation unit 106*b* to calculate an average value of previous brightness of the pixel value within the same frame, and specifies emission intensity during the test emission on the basis of the average value of brightness. That is, the test emission control unit 106*c*, for example, as illustrated in FIG. 24, may set the emission intensity in the test emission (Test emission power (mV)) for average value of brightness of the pixel value in the same frame (Output Video avg (%)). That is, for a case where the average value of brightness of the pixel value in the frame is low and the image is dark overall as described above, intensity of the test emission is also set low and dark, and on the contrary, for a case where the average value of brightness is high and the image is bright overall, intensity of the test emission is also set high and bright. By setting the emission intensity in this way, it is possible to set brightness at which execution of the test emission is more difficult to recognize by the viewer.

In step S21, the test emission control unit 106c measures signal currents of all areas of the areas 102a to 102d of the PD 102 to be measured, without causing the laser light source unit 24 to be measured to emit light, in any of the laser light source units 24R, 24G, and 24B. That is, in this case, the test emission control unit 106c sets all the switches 103a to 103d in the switching unit 103 to ON so as to be able to measure a total of the areas 102a to 102d to be measured, and controls the ADC 105 at the corresponding timing to measure the signal voltage, and acquires a measurement result.

In step S22, the test emission control unit 106c causes the laser light source unit 24 to be measured to emit light.

In step S23, the test emission control unit 106c measures all the signal currents of the areas 102a to 102d of the PD 102 to be measured, of when the laser light source unit 24 to be measured emits light, in any of the laser light source units 24R, 24G, and 24B. Also at this time, the test emission control unit 106c sets all the switches 103a to 103d in the switching unit 103 to ON so as to be able to measure all the signal current of the areas 102a to 102d to be measured, and controls the ADC 105 at the corresponding timing to measure the signal voltage, and acquires a measurement result.

In step S24, the correction value calculation unit 106f calculates a difference between the measurement result and an expected value for power (light output) of the laser beam of when the test emission is performed. That is, the correction value calculation unit 106f subtracts an offset value in a non-emission state from a measurement value in an emission state, and further, uses the difference from the expected value to calculate a correction value (correction coefficient), and stores the correction value in the memory 106e.

In step S25, the LD control unit 106a corrects the emission power on the basis of the correction value (correction coefficient) obtained from the difference from the expected value stored in the memory 106e, and the processing proceeds to step S17. In the following, the test emission for LD power control is repeated, whereby the correction value (correction coefficient) is sequentially updated.

As a more specific technique, for example, in the following processing, the correction value calculation unit 106f calculates a value to which the pixel signal is added, which corresponds to the difference obtained by the test emission for LD power control, as the correction coefficient, and stores the value in the memory 106e. Then, the LD control unit 106a reads the correction coefficient stored in the memory 106e, and adds the correction coefficient to the pixel signal in the input image signal, thereby converting the pixel signal into a pixel signal for which actually necessary power (light output) can be obtained, and causing the laser light source unit 24 to perform modulation output. With such control, the power (light output) is corrected of the laser beam output by the laser light source unit 24.

The power (light output) of the laser light source unit 24 is controlled in this way, whereby it does not occur that the brightness (light output) of the projection image is different from brightness expected from the pixel signal, and it is possible to perform projection on the screen 14 with brightness faithful to the pixel signal. As a result, it is possible to improve image quality of the projection image 14a projected by the projector 11.

In step S19, in a case where it is determined that it is not necessary to execute the test emission for LD power control, the processing proceeds to step S26.

In step S26, the test emission control unit 106c determines whether or not it is necessary to execute optical axis correction in any of the laser light source units 24R, 24G, and 24B. For example, in the same frame, presence/absence of the optical axis correction is determined on the basis of whether or not the optical axis correction has been performed, and in a case where the optical axis correction has already been performed in the same frame, it is determined that the optical axis correction is not necessary, and the processing proceeds to step S17.

On the other hand, in step S26, in a case where it is determined that it is necessary to execute the optical axis correction, the processing proceeds to step S27.

In step S27, the test emission control unit 106c measures the signal current of any area of the areas 102a to 102d of the PD 102 to be measured that has not been measured, without causing any of the laser light source units 24R, 24G, and 24B, the laser light source unit 24 to be measured, to emit light. That is, in this case, the test emission control unit 106c sets only the corresponding switch of the switches 103a to 103d in the switching unit 103 to ON so as to be able to measure any of the areas 102a to 102d to be measured, and controls the ADC 105 at the corresponding timing to measure the signal voltage, and acquires a measurement result.

In step S28, the test emission control unit 106c causes any of the laser light source units 24R, 24G, and 24B, the laser light source unit 24 to be measured, to emit light. Power of the test emission is fixed and can be measured on the same condition in each measurement of the areas 102a to 102d of the PD 102. The emission power is decreased to decrease visibility, and a gain of a detection system is switched to a high gain, whereby stable measurement can be realized. Regarding the power of the test emission, similarly to the processing in step S20, it is also possible to execute with brightness synchronized with the projection image 14a.

In step S29, the test emission control unit 106c measures the signal current of any of the areas 102a to 102d of the PD 102 to be measured that has not been measured, of when any of the laser light source units 24R, 24G, and 24B, the laser light source unit 24 to be measured, emits light. Also at this time, the test emission control unit 106c sets only the corresponding switch of the switches 103a to 103d in the switching unit 103 to ON so as to be able to measure the signal current of any of the area 102a to 102d to be measured, and controls the ADC 105 at the corresponding timing to measure the signal voltage, and acquires a measurement result.

In step S30, the test emission control unit 106c determines whether or not it is possible to calculate correction values of the laser light source units 24R, 24G, and 24B. That is, when the test emission is performed for each of the laser light source units 24R, 24G, and 24B, and further, a measurement result is obtained for each of the areas 102a to 102d in the PD 102, it is possible to calculate the correction values. Therefore, whether or not it is possible to calculate the correction values is determined on the basis of whether or not values including a total of twelve parameters have been measured that are measurement results of the respective areas 102a to 102d of the PD 102 during the test emission of each of the laser light source units 24R, 24G, and 24B.

In step S30, for example, in a case where it is determined that it is not possible to calculate the correction values, that is, in a case where the total of twelve parameters have not been measured, the processing proceeds to step S17.

In step S30, for example, in a case where it is determined that it is possible to calculate the correction values, that is, in a case where the total of twelve parameters have been measured, the processing proceeds to step S31.

In step S31, the correction value calculation unit 106f calculates a position of the center of gravity of the laser spot of each of the laser light source units 24R, 24G, and 24B on the PD 102. It is known that a shape of the laser spot on the PD 102 is, for example, an elliptical shape as illustrated in the lower left part of FIG. 21. For example, in a case where it is known that a major axis is By and a minor axis is Bx in the elliptical shape in the lower left part of FIG. 21, and at the same time, in a case where initial values of the respective areas 102a to 102d of the PD 102 in FIG. 21 are respectively A to D, a position of the center of gravity (X, Y) can be obtained as (X, Y)=(Bx×Xoff/TTL, By×Yoff/TTL). Here, Xoff is ((A+B)−(C+D)), Yoff is ((A+D)−(B+C)), and TTL=A+B+C+D.

Figure 25:
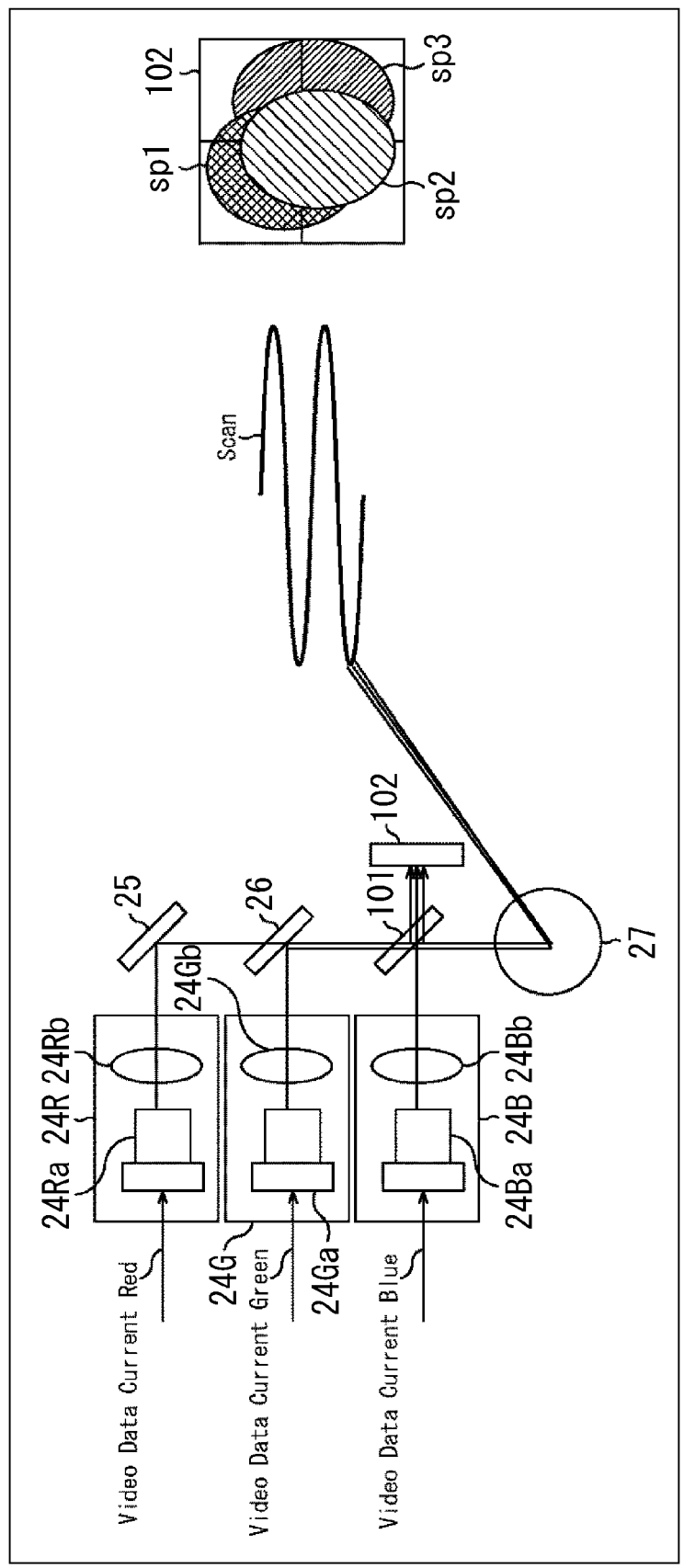
FIG. 25 is a diagram for describing a position of the laser spot on the PD during test emission of each of the laser light source units 24R, 24G, and 24B.

The correction value calculation unit 106f calculates the position of the center of gravity described above for the laser spots sp1, sp2, and sp3 on the PD 102 of the respective laser light source units 24R, 24G, and 24B, as illustrated in the right part of FIG. 25, for example.

In step S32, the correction value calculation unit 106f calculates a difference between current and previous positions of the center of gravity for the laser spots sp1, sp2, and sp3 on the PD 102 of the respective laser light source units 24R, 24G, and 24B. Here, as the difference, differences Δsp1, Δsp2, and Δsp3 are obtained that are differences respectively between the positions of the center of gravity of the laser spots sp1, sp2, and sp3 measured in the previous test emission and positions of the center of gravity of the laser spots sp1, sp2, and sp3 measured in the current test emission. However, in the initial processing, since there are no previous positions of the center of gravity of the laser spots, the differences Δsp1, Δsp2, and Δsp3 do not occur, and the processing is skipped, and the processing is performed in the second and subsequent test emissions.

In step S33, the correction value calculation unit 106f calculates (updates) coefficients to be the correction values on the basis of the differences.

In step S34, the correction value calculation unit 106f stores a set of the correction values including the correction coefficient obtained, in the memory 106e, as correction information.

More specifically, in a case where the positions of the center of gravity of the laser spots sp1, sp2, and sp3 on the PD 102 of the laser light source units 24R, 24G, and 24B are respectively sp1 (x1, y1), sp2 (x2, y2), and sp3 (x3, y3), the correction values can be obtained as follows.

That is, when the laser spot sp1 is the origin (0, 0), coordinates of the laser spot sp2 and sp3 are respectively represented by sp1 (0, 0), sp2 (x2−x1, y2−y1), and sp3 (x3−x1, y3−y1).

Here, the pixel positions sc1, sc2, and sc3 of when the pixel position corresponding to sp1 is the origin in the projection image 14a on the screen 14 corresponding to the laser spots sp1, sp2, and sp3 on the PD 102, are respectively the pixel positions sc1 (0, 0), sc2 (comp2x, comp2y), and sc3 (comp3x, comp3y).

Here, comp2x is an x coordinate of the pixel position sc2 on the screen 14 projected by the laser beam of the laser spot sp2 on the PD 102, and similarly, comp2y is its y coordinate. Similarly, comp3x, comp3y are respectively an x coordinate and a y coordinate of the pixel position sc3 on the screen 14 projected by the laser beam of the laser spot sp3 on the PD 102.

At this time, correction values Cr, Cg, and Cb to be conversion coefficients to pixel position that should be projected respectively by the laser light source units 24R, 24G, and 24B are respectively Cr (0, 0), Cg (comp2x/(x2−x1), comp2y/(y2−y1)), and Cb (comp3x/(x3−x1), comp3y/(y3−y1)).

The correction values Cr, Cg, and Cb to be the conversion coefficients obtained in this way are obtained as the correction values in the initial processing.

In addition, the differences Δsp1, Δsp2, and Δsp3 obtained in step S32 described above are obtained as follows.

Incidentally, in the following description, laser spots sp1', sp2', and sp3' on the PD 102 of the respective laser light source units 24R, 24G, and 24B obtained by new test emission are respectively sp1' (x1', y1'), sp2' (x2', y2'), and sp3' (x3', y3'), and previous laser spots sp1, sp2, and sp3 are respectively sp1 (x1, y1), sp2 (x2, y2), and sp3 (x3, y3).

In a case where sp1' is the origin (0, 0), coordinates of the new laser spots sp1' (x1', y1'), sp2' (x2', y2'), and sp3' (x3', y3') are respectively converted to sp1' (0, 0), sp2' (x2'−x1', y2'−x1'), and sp3' (x3'−x1', y3'−y1').

Accordingly, sp1' is set as a reference, whereby the differences Δsp1, Δsp2, and Δsp3 are respectively Δsp1 (0, 0), Δsp2 (Δx2=(x2'−x1')−(x2−x1), Δy2=(y2'−y1')−(y2−y1)), and Δsp3 (Δx3=(x3'−x1')−(x3−x1), Δy3=(y3'−y1')−(y3−y1)).

As a result, the correction values Cr, Cg, and Cb are respectively updated, and are Cr' (0, 0), Cg' (Δx2×comp2x/(x2−x1), Δy2×comp2y/(y2−y1)), and Cb' (Δx3×comp3x/(x3−x1), Δy3×comp3y/(y3−y1)).

Further, in a case where the pixel positions of the input image signal are each (x, y) in the laser light source units 24R, 24G, and 24B, by processing in step S15, in a case where the correction values Cr, Cg, and Cb are respectively Cr (crx, cry), Cg (cgx, cgy), and Cb (cbx, cby), the LD control unit 106a performs correction by setting the pixel positions that should actually emit light to (x, y), (x×cgx, y×cgy), and (x×cbx, y×cby).

With the above processing, it is possible to correct the misalignment of the optical axis by calculating the correction values in accordance with a relationship between the positions of the center of gravity of the respective optical axes of the laser light source units 24R, 24G, and 24B, that is, the offsets, and correcting the pixel positions corresponding to the input image signal. Further, for the correction values, the positions of the center of gravity of the respective optical axes of the laser light source units 24R, 24G, and 24B are repeatedly measured, and updated in accordance with the differences from the previous positions, so that it is possible to set appropriate correction values even if something occurs that changes the misalignment of the optical axis such as temperature change. As a result, it is possible to suppress degradation of image quality due to, for example, color bleeding caused by the misalignments of the optical axes of the laser light source units 24R, 24G, and 24B of R, G, and B, and as a result, it is possible to improve image quality of the projection image 14a projected by the projector 11.

Figure 26:
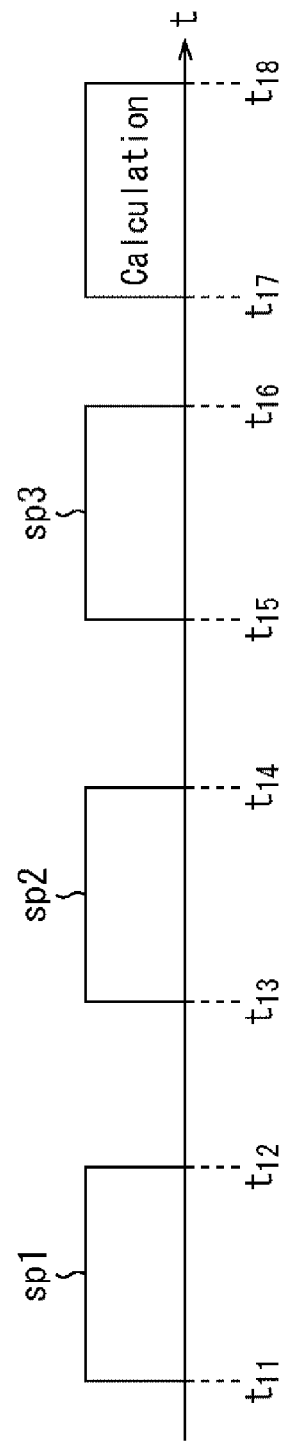
FIG. 26 is a diagram for describing timings of calculating a correction value, and the test emission of each of the laser light source units 24R, 24G, and 24B.

In addition, in this case, the processing is performed in a time chart as illustrated in FIG. 26, for example. That is, for the corresponding beam spots sp1, sp2, and sp3 by the test emissions of the respective laser light source units 24R, 24G, and 24B, the processing from step S20 to step S25 is repeated at each of the time from t11 to t12, the time from t13 to t14, and the time from t15 to t16, and measurement results are obtained for four areas of the areas 102a to 102d in the PD 102, and the correction values can be calculated (updated) by the processing from step S26 to step S29, in the time from t17 to t18.

Figure 27:
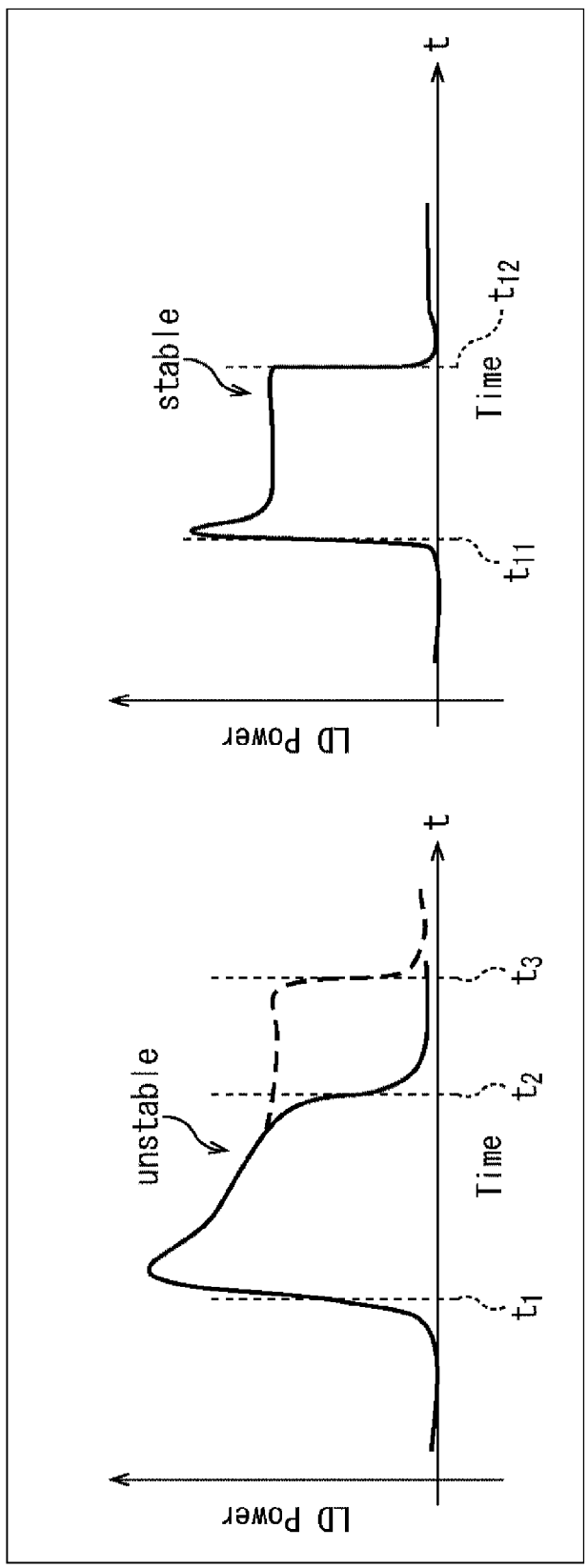
FIG. 27 is a diagram for describing a pulse waveform of the test emission.

Further, in the test emission, regarding pulse width at the time of causing the laser light source units 24R, 24G, and 24B to emit light, it is necessary to be determined by a relationship between stability of modulation of the laser beam generation unit 24a and response speed at the time of measuring the signal voltage according to the amount of light of each of the areas 102a to 102d of the PD 102. That is, for example, as illustrated in the left part of FIG. 27, in the time from t1 to t2, the pulse waveform is unstable, so that, in a case of such a characteristic, it is desirable to set the time from t1 to t3, and perform measurement with a pulse waveform having a long stable state. However, as illustrated in the right part of FIG. 27, if it is stable as the waveform even in a case of the time from t11 to t12 that is a short time, as far as measurement is possible, the measurement may be performed in this time zone.

In the above, an example has been described of setting the emission intensity on the basis of the average pixel value in the frame, at the time of test emission; however, if it is possible to use the emission intensity difficult to recognize by the viewer, other methods may be used. For example, the emission intensity may be changed in accordance with a scene presented by the projection image 14a, and, for example, in a case of displaying fireworks in the night sky, relatively high emission intensity may be used.

In addition, the emission intensity may be increased in a case of a bright image, and the emission intensity may be decreased in a case of a dark image. Further, in a case where the test emission is switched for each of R, G, and B, a test emission values may be independently set in accordance with the output image of each of R, G, and B. That is, for example, in a case of a bright green image, the test emission intensity of green (G) is increased, and other emission intensities of red (R) and blue (B) may be decreased. Further, considering from visibility of human eyes, the emission intensity may be determined by only the green image that is the most sensitive. In addition, it is possible to randomly change the position of the test emission to suppress periodic repeated emission at the same position, and decrease visibility of human eyes.

Further, since the misalignment of the optical axis tends to increase as the temperature increases, a frequency of occurrence of the test emission may be changed in accordance with a frequency of issue of the laser beam or the temperature of the laser beam generation units 24a. For example, in a case of high temperature, the test emission may be performed frequently, and in a case of low temperature, the frequency of the test emission may be decreased. Further, in the configuration example of the present embodiment, an example has been described of correcting two misalignments of an "axis misalignment", and a "misalignment (difference) from the expected value of the light output"; however, it is possible to improve image quality of the projection image even if only at least one of the "axis misalignment" and the "misalignment (difference) from the expected value of the light output" is corrected. In a case where only the "misalignment (difference) from the expected value of the light output" is corrected out of the two misalignments, it is not necessary to divide the PD 102 into four areas, and it is sufficient that the signal voltage according to the amount of light can be measured overall.

In addition, in the above, the projector 11 in the projection system 1 has been described as an example; however, as far as projection is possible by the projector 11, a configuration other than the projection system 1 may be used. For example, the projection image 14a may be projected on a front window of an automobile by the projector 11, or may be projected on a head up display (HUD) used by, for example, a pilot of an aircraft or the like.

<Example of Execution by Software>

By the way, a series of the processing described above can be executed by hardware; however, it can also be executed by software. In a case where the series of the processing is executed by the software, a program configuring the software is installed from a recording medium to a computer incorporated in dedicated hardware, or, for example, a general purpose personal computer capable of executing various functions by installing various programs.

FIG. 28 illustrates a configuration example of a general purpose personal computer. The personal computer incorporates a Central Processing Unit (CPU) 1001. The CPU 1001 is connected to an input/output interface 1005 via a bus 1004. The bus 1004 is connected to Read Only Memory (ROM) 1002 and Random Access Memory (RAM) 1003.

The input/output interface 1005 is connected to an input unit 1006 including input devices such as a keyboard, a mouse for a user to input an operation command, an output unit 1007 for outputting to a display device a processing operation screen and an image of a processing result, a storage unit 1008 including a hard disk drive and the like for storing programs and various data, and a communication unit 1009 including a Local Area Network (LAN) adapter and the like for executing communication processing via a network typified by the Internet. In addition, a drive 1010 is connected for reading data from and writing data to a removable medium 1011 such as a magnetic disk (including flexible disk), an optical disk (including Compact Disc-Read Only Memory (CD-ROM), a Digital Versatile Disc (DVD)), a magneto optical disk (including Mini Disc (MD)), or a semiconductor memory.

The CPU 1001 executes various types of processing in accordance with a program stored in the ROM 1002, or a program read from the removable medium 1011, such as the magnetic disk, the optical disk, the magneto optical disk, or the semiconductor memory, to be installed to the storage unit 1008, and loaded to the RAM 1003 from the storage unit 1008. In the RAM 1003, data necessary for the CPU 1001 to execute the various types of processing is also stored appropriately.

In the computer configured as described above, for example, the CPU 1001 loads the program stored in the storage unit 1008 to the RAM 1003 via the input/output interface 1005 and the bus 1004 to execute the series of processing described above.

The program executed by the computer (CPU 1001) can be provided, for example, by being recorded in the removable medium 1011 as a package medium or the like. In addition, the program can be provided via a wired or wireless transmission medium such as a local area network, the Internet, digital satellite broadcasting.

In the computer, the program can be installed to the storage unit 1008 via the input/output interface 1005 by mounting the removable medium 1011 to the drive 1010. In addition, the program can be installed to the storage unit 1008 by receiving with the communication unit 1009 via the wired or wireless transmission medium. Further, the program can be installed in advance to the ROM 1002 and the storage unit 1008.

Incidentally, the program executed by the computer can be a program by which the processing is performed in time series along the order described herein, and can be a program by which the processing is performed in parallel or at necessary timing such as when a call is performed.

<Example Applied to Electronic Device as Projection System Module>

Further, in the above, an example has been described in which the projection system 1 is configured alone; however, for example, a configuration excluding the screen 14 of the projection system 1 may be made into a projection system module configured by about one chip, to be incorporated in an electronic device such as a mobile phone, a smart phone, a mobile terminal, or a portable imaging device, and, for example, an image stored in each electronic device or an image received by communication may be projected.

FIG. 29 illustrates a configuration example of an electronic device including a projection system module 1111 in which a function as the projection system 1 excluding the screen 14 of FIG. 1 is modularized on one chip. Here, functions and configurations of a CPU 1031 to a removable medium 1041 are substantially the same function as the CPU1001 to the removable medium 1011, so that description thereof will be omitted. However, the CPU 1031 to the removable medium 1041 of the electronic device in FIG. 29 are miniaturized and more portable than the CPU1001 to the removable medium 1011, in general. Incidentally, a function of the projection system module 1111 is the same as the projection system 1 in FIG. 1, so that description thereof will be omitted.

In addition, herein, a system means an aggregation of a plurality of constituents (apparatus, module (component), and the like), and it does not matter whether or not all of the constituents are in the same cabinet. Therefore, a plurality of apparatuses that is accommodated in a separate cabinet and connected to each other via a network and one apparatus that accommodates a plurality of modules in one cabinet are both systems.

Incidentally, the embodiment of the present technology is not limited to the embodiments described above, and various modifications are possible without departing from the scope of the present technology.

For example, the present technology can adopt a configuration of cloud computing that shares one function in a plurality of apparatuses via a network to process in cooperation.

In addition, each step described in the above flowchart can be executed by sharing in a plurality of apparatuses, other than being executed by one apparatus.

Further, in a case where a plurality of pieces of processing is included in one step, the plurality of pieces of processing included in the one step can be executed by sharing in a plurality of apparatuses, other than being executed by one apparatus.

Incidentally, the present technology can also adopt the following configuration.

<1> A projection device including:

a laser beam generation unit that generates a laser beam according to a pixel signal of an input image;

one scan unit that reflects the laser beam generated by the laser beam generation unit and performs scanning to project the laser beam on a screen;

a detection unit that detects a position of an optical axis of the laser beam generated by the laser beam generation unit;

a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

<2> The projection device according to <1>, in which
the detection unit
includes a plurality of light amount detection units each of which detects an amount of light of the laser beam in a corresponding area, the area being a two-dimensional plane substantially perpendicular to an optical axis of the laser beam, the area being divided into a plurality of areas, and
detects the position of the optical axis of the laser beam on the basis of a ratio of the amount of light detected by each of the plurality of light amount detection units.

<3> The projection device according to <1> or <2>, in which
the correction coefficient calculation unit
obtains an amount of shift of a pixel position projected on the screen on the basis of the information regarding the position of the optical axis of the laser beam in the detection unit, and, on the basis of the amount of shift, calculates the correction coefficient, as a correction value, for converting a pixel position to be projected, into a pixel position at which the laser beam generated by the laser beam generation unit is actually projected.

<4> The projection device according to <3>, in which
the correction unit corrects a pixel position in the input image with the correction coefficient that is the correction value, and supplies a pixel signal of the pixel position corrected to the laser beam generation unit, and
the laser beam generation unit generates the laser beam on the basis of the pixel signal of the pixel position corrected.

<5> The projection device according to <3>, in which
the correction coefficient calculation unit updates the correction coefficient on the basis of a difference between a previous amount of shift of the optical axis of the laser beam and a current amount of shift of the optical axis.

<6> The projection device according to <5>, in which
the correction unit corrects a pixel position of the pixel signal in the input image with the correction coefficient updated, and supplies a pixel signal of the pixel position corrected to the laser beam generation unit, and
the laser beam generation unit generates the laser beam on the basis of the pixel signal of the pixel position corrected.

<7> The projection device according to any of <1> to <6>, in which
the laser beam generation unit, the collimator lens, and the laser beam generation unit are provided for each of R, G, and B,
the detection unit detects a position of the optical axis of each of the R, G, and B,
the correction coefficient calculation unit, on the basis of information regarding the position of the optical axis of each of the R, G, and B detected by the detection unit, sets a position of any optical axis as an origin, and obtains a difference from a position of another optical axis, and, on the basis of the difference, calculates a correction coefficient for correcting a pixel position of when projection is performed on the screen for the other optical axis, and the correction unit converts the pixel position of the pixel signal of the input image signal corresponding to the other optical axis to perform correction, on the basis of the correction coefficient.

<8> The projection device according to <7>, in which the correction coefficient calculation unit, on the basis of information regarding the position of the optical axis of each of the R, G, and B detected by the detection unit, sets a position of any optical axis as an origin, and obtains a current difference from a position of another optical axis, and, on the basis of an amount of change from the difference in the past, updates the correction coefficient for correcting the pixel position of when projection is performed on the screen for the other optical axis.

<9> The projection device according to any of <1> to <8>, further including a test emission control unit that controls the laser beam generation unit to control generation of a laser beam for test emission for calculating the correction coefficient, in which the correction coefficient calculation unit calculates the correction coefficient for correcting the amount of shift of the laser beam, on the basis of the position of the optical axis detected by the detection unit, when control is performed by the test emission control unit and the laser beam for test emission is generated by the laser beam generation unit.

<10> The projection device according to <9>, in which the test emission control unit controls the laser beam generation unit to generate the laser beam for test emission for calculating the correction coefficient, when a position being scanned on the screen by the scan unit is a blanking area for a projection image.

<11> The projection device according to <9> or <10>, in which the test emission control unit randomly sets, as a test emission position, any of a plurality of partial areas included in the blanking area, and controls the laser beam generation unit to generate the laser beam for test emission for calculating the correction coefficient, when a position being scanned on the screen by the scan unit is a blanking area for a projection image and is an area set as the test emission position.

<12> The projection device according to any of <9> to <11>, further including an average value calculation unit that calculates an average value on a frame-by-frame basis of brightness of a pixel on the screen, when a laser beam for other than the test emission is generated by the laser beam generation unit, in which the test emission control unit controls the laser beam generation unit to generate the laser beam for test emission for calculating the correction coefficient with brightness based on the average value.

<13> The projection device according to any of <9> to <12>, in which the test emission control unit controls the laser beam generation unit to generate the laser beam for test emission for calculating the correction coefficient with emission intensity according to a tendency of color of the image projected on the screen by an input image signal.

<14> The projection device according to any of <9> to <13>, in which the test emission control unit controls the laser beam generation unit, on the basis of temperature and emission frequency of the laser beam generation unit, to generate the laser beam for test emission for calculating the correction coefficient.

<15> A projection method of a projection device, the projection device including:

a laser beam generation unit that generates a laser beam according to a pixel signal of an input image;

one scan unit that reflects the laser beam generated by the laser beam generation unit and performs scanning to project the laser beam on a screen;

a detection unit that detects a position of an optical axis of the laser beam generated by the laser beam generation unit;

a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient, the projection method including:

generating the laser beam according to the pixel signal of the input image, by the laser beam generation unit;

reflecting the laser beam generated by the laser beam generation unit and performing scanning to project the laser beam on the screen, by the operation unit;

detecting the position of the optical axis of the laser beam generated by the laser beam generation unit, by the detection unit;

calculating the correction coefficient for correcting the amount of shift of the laser beam on the basis of the information regarding the position of the optical axis detected by the detection unit, by the correction coefficient calculation unit; and correcting the pixel signal in the input image on the basis of the correction coefficient, by the correction unit.

<16> A program to cause a computer to function as:

a laser beam generation unit that generates a laser beam according to a pixel signal of an input image;

one scan unit that reflects the laser beam generated by the laser beam generation unit and performs scanning to project the laser beam on a screen;

a detection unit that detects a position of an optical axis of the laser beam generated by the laser beam generation unit;

a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

<17> A projection module including:

a laser beam generation unit that generates a laser beam according to a pixel signal of an input image;

one scan unit that reflects the laser beam generated by the laser beam generation unit and performs scanning to project the laser beam on a screen;

a detection unit that detects a position of an optical axis of the laser beam generated by the laser beam generation unit;

a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

<18> An electronic device including:

a laser beam generation unit that generates a laser beam according to a pixel signal of an input image;

one scan unit that reflects the laser beam generated by the laser beam generation unit and performs scanning to project the laser beam on a screen;

a detection unit that detects a position of an optical axis of the laser beam generated by the laser beam generation unit;

a correction coefficient calculation unit that calculates a correction coefficient for correcting an amount of shift of the laser beam on the basis of information regarding the position of the optical axis detected by the detection unit; and a correction unit that corrects the pixel signal in the input image on the basis of the correction coefficient.

REFERENCE SIGNS LIST

1 Projection system
11 projector
12 Host controller
13 Distance measurement unit
14 Screen
14a Projection image
21 Controller
22 Laser driver
23 Mirror driver
24R, 24G, 24B Laser light source unit
24a, 24Ra, 24Ga, 24Ba Laser beam generation unit
24b, 24Rb, 24Gb, 24Bb Collimator lens
25 Mirror
26-1, 26-2 Dichroic mirror
27 Drive mirror
28 Optical lens
101 Beam splitter
102 Photodetector (PD)
102a to 102d Area
103 Switching unit
103a to 103d Switch
104 TIA (Trance Impedance Amplifier)
105 ADC (Analog Digital Converter)
106 Controller
106a LD control unit
106b Average value calculation unit
106c Test emission control unit
106d Mirror control unit
106e Memory
106f Correction value calculation unit

The invention claimed is:

1. A projection device comprising:
a laser light source configured to generate a laser beam according to a pixel signal of an input image;
one mirror configured to reflect the laser beam generated by the laser light source and perform scanning to project the laser beam on a screen;
a detection unit including at least one photodetector configured to detect a position of an optical axis of the laser beam generated by the laser light source;
a correction coefficient calculation circuitry configured to calculate a correction coefficient for correcting an amount of shift of the laser beam on the basis of information regarding the position of the optical axis detected by the detection unit; and
a correction circuitry configured to correct the pixel signal in the input image on the basis of the correction coefficient, wherein
the at least one photodetector is a plurality of photodetectors, each of which detects an amount of light of the laser beam in a corresponding area, the area being a two-dimensional plane substantially perpendicular to the optical axis of the laser beam, the area being divided into a plurality of sub-areas, and
the detection unit is configured to detect the position of the optical axis of the laser beam on the basis of a ratio of the amount of light detected by each of the plurality of photodetectors.

2. The projection device according to claim 1, wherein the correction coefficient calculation circuitry is configured to obtain an amount of shift of a pixel position projected on the screen on the basis of the information regarding the position of the optical axis of the laser beam in the detection unit, and, on the basis of the amount of shift, to calculate the correction coefficient, as a correction value, for converting a pixel position to be projected, into a pixel position at which the laser beam generated by the laser light source is actually projected.

3. The projection device according to claim 2, wherein the correction circuitry is configured to correct a pixel position in the input image with the correction coefficient that is the correction value, and to supply a pixel signal of the pixel position corrected to the laser light source, and
the laser light source is configured to generate the laser beam on the basis of the pixel signal of the pixel position corrected.

4. The projection device according to claim 2, wherein the correction coefficient calculation circuitry is configured to update the correction coefficient on the basis of a difference between a previous amount of shift of the optical axis of the laser beam and a current amount of shift of the optical axis.

5. The projection device according to claim 4, wherein the correction circuitry is configured to correct a pixel position of the pixel signal in the input image with the correction coefficient updated, and to supply a pixel signal of the pixel position corrected to the laser light source, and
the laser light source is configured to generate the laser beam on the basis of the pixel signal of the pixel position corrected.

6. The projection device according to claim 1, wherein the laser light source, a collimator lens, and the laser beam generation unit are provided for each of R, G, and B,
the detection unit is configured to detect a position of the optical axis of each of the R, G, and B,
the correction coefficient calculation circuitry is configured to set, on the basis of information regarding the position of the optical axis of each of the R, G, and B detected by the detection unit, a position of any optical axis as an origin, to obtain a difference from a position of another optical axis, and, on the basis of the difference, to calculate a correction coefficient for correcting a pixel position of when projection is performed on the screen for the other optical axis, and
the correction circuitry is configured to convert the pixel position of the pixel signal of the input image signal corresponding to the other optical axis to perform correction, on the basis of the correction coefficient.

7. The projection device according to claim 6, wherein the correction coefficient calculation circuitry is configured to set, on the basis of information regarding the position of the optical axis of each of the R, G, and B detected by the detection unit, a position of any optical axis as an origin, to obtain a current difference from a position of another optical axis, and, on the basis of an amount of change from the difference in the past, to update the correction coefficient for correcting the pixel position of when projection is performed on the screen for the other optical axis.

8. The projection device according to claim 1, further comprising
a test emission control circuitry configured to control the laser beam generation unit to control generation of a laser beam for test emission for calculating the correction coefficient, wherein
the correction coefficient calculation circuitry is configured to calculate the correction coefficient for correcting the amount of shift of the laser beam, on the basis of the position of the optical axis detected by the detection unit, when control is performed by the test emission control circuitry and the laser beam for test emission is generated by the laser light source.

9. The projection device according to claim 8, wherein
the test emission control circuitry is configured to control the laser light source to generate the laser beam for test emission for calculating the correction coefficient, when a position being scanned on the screen by the mirror is a blanking area for a projection image.

10. The projection device according to claim 8, wherein
the test emission control circuitry is configured to randomly set, as a test emission position, any of a plurality of partial areas included in the blanking area, and
the test emission control circuitry is configured to control the laser light source to generate the laser beam for test emission for calculating the correction coefficient, when a position being scanned on the screen by the mirror is a blanking area for a projection image and is an area set as the test emission position.

11. The projection device according to claim 8, further comprising
an average value calculation circuitry configured to calculate an average value on a frame-by-frame basis of brightness of a pixel on the screen, when a laser beam for other than the test emission is generated by the laser light source, wherein
the test emission control circuitry is configured to control the laser light source to generate the laser beam for test emission for calculating the correction coefficient with brightness based on the average value.

12. The projection device according to claim 8, wherein
the test emission control circuitry is configured to control the laser light source to generate the laser beam for test emission for calculating the correction coefficient with emission intensity according to a tendency of color of the image projected on the screen by an input image signal.

13. The projection device according to claim 8, wherein
the test emission control circuitry is configured to control the laser light source, on the basis of temperature and emission frequency of the laser light source, thereby to generate the laser beam for test emission for calculating the correction coefficient.

14. The projection device according to claim 1, wherein
the detection unit is configured to generate a signal current according to an amount of light, and to output the signal current to a controller including the correction coefficient calculation circuitry.

15. A projection method of a projection device, the projection device comprising:
a laser light source configured to generate a laser beam according to a pixel signal of an input image;
one mirror configured to reflect the laser beam generated by the laser light source and perform scanning to project the laser beam on a screen;
a detection unit including at least one photodetector configured to detect a position of an optical axis of the laser beam generated by the laser light source;
a correction coefficient calculation circuitry configured to calculate a correction coefficient for correcting an amount of shift of the laser beam on the basis of information regarding the position of the optical axis detected by the detection unit; and
a correction circuitry configured to correct the pixel signal in the input image on the basis of the correction coefficient,
the projection method comprising:
generating the laser beam according to the pixel signal of the input image, by the laser light source;
reflecting the laser beam generated by the laser beam generation unit and performing scanning to project the laser beam on the screen, by the mirror;
detecting the position of the optical axis of the laser beam generated by the laser light source, by the at least one photodetector of the detection unit;
calculating the correction coefficient for correcting the amount of shift of the laser beam on the basis of the information regarding the position of the optical axis detected by the detection unit, by the correction coefficient calculation circuitry; and
correcting the pixel signal in the input image on the basis of the correction coefficient, by the correction circuitry, wherein
the at least one photodetector is a plurality of photodetectors, each of which detects an amount of light of the laser beam in a corresponding area, the area being a two-dimensional plane substantially perpendicular to the optical axis of the laser beam, the area being divided into a plurality of sub-areas, and
the detecting the position of the optical axis of the laser beam is performed on the basis of a ratio of the amount of light detected by each of the plurality of photodetectors.

16. A non-transitory computer-readable medium storing instructions that, when executed by a processor of a computer, cause the computer to function as:
a laser light source configured to generate a laser beam according to a pixel signal of an input image;
one mirror configured to reflect the laser beam generated by the laser light source and perform scanning to project the laser beam on a screen;
a detection unit including at least one photodetector configured to detect a position of an optical axis of the laser beam generated by the laser light source;
a correction coefficient calculation circuitry configured to calculate a correction coefficient for correcting an amount of shift of the laser beam on the basis of information regarding the position of the optical axis detected by the detection unit; and
a correction circuitry configured to correct the pixel signal in the input image on the basis of the correction coefficient, wherein
the at least one photodetector is a plurality of photodetectors, each of which detects an amount of light of the laser beam in a corresponding area, the area being a two-dimensional plane substantially perpendicular to the optical axis of the laser beam, the area being divided into a plurality of sub-areas, and the detection unit is configured to detect the position of the optical axis of the laser beam on the basis of a ratio of the amount of light detected by each of the plurality of photodetectors.

17. A projection module comprising:

a laser light source configured to generate a laser beam according to a pixel signal of an input image;

one mirror configured to reflect the laser beam generated by the laser light source and perform scanning to project the laser beam on a screen;

a detection unit including at least one photodetector configured to detect a position of an optical axis of the laser beam generated by the laser light source;

a correction coefficient calculation circuitry configured to calculate a correction coefficient for correcting an amount of shift of the laser beam on the basis of information regarding the position of the optical axis detected by the detection unit; and a correction circuitry configured to correct the pixel signal in the input image on the basis of the correction coefficient, wherein the at least one photodetector is a plurality of photodetectors, each of which detects an amount of light of the laser beam in a corresponding area, the area being a two-dimensional plane substantially perpendicular to the optical axis of the laser beam, the area being divided into a plurality of sub-areas, and the detection unit is configured to detect the position of the optical axis of the laser beam on the basis of a ratio of the amount of light detected by each of the plurality of photodetectors.

18. An electronic device comprising:

a laser light source configured to generate a laser beam according to a pixel signal of an input image;

one mirror configured to reflect the laser beam generated by the laser light source and perform scanning to project the laser beam on a screen;

a detection unit including at least one photodetector configured to detect a position of an optical axis of the laser beam generated by the laser light source;

a correction coefficient calculation circuitry configured to calculate a correction coefficient for correcting an amount of shift of the laser beam on the basis of information regarding the position of the optical axis detected by the detection unit; and a correction circuitry configured to correct the pixel signal in the input image on the basis of the correction coefficient, wherein the at least one photodetector is a plurality of photodetectors, each of which detects an amount of light of the laser beam in a corresponding area, the area being a two-dimensional plane substantially perpendicular to the optical axis of the laser beam, the area being divided into a plurality of sub-areas, and the detection unit is configured to detect the position of the optical axis of the laser beam on the basis of a ratio of the amount of light detected by each of the plurality of photodetectors.

* * * * *